US012786289B2

(12) United States Patent
Bshara et al.

(10) Patent No.: US 12,786,289 B2
(45) **Date of Patent: *Nov. 3, 2026**

(54) DISTRIBUTION OF MESSAGES WITH GUARANTEED OR SYNCHRONIZED TIME OF DELIVERY

(71) Applicant: Amazon Technologies, Inc., Seattle, WA (US)

(72) Inventors: Said Bshara, Tira (IL); Alan Michael Judge, Dublin (IE); Erez Izenberg, Tel Aviv-Jaffa (IL); Julien Ridoux, Seattle, WA (US); Joshua Benjamin Levinson, Seattle, WA (US); Anthony Nicholas Liguori, Bainbridge Island, WA (US); Nafea Bshara, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 450 days.

This patent is subject to a terminal disclaimer.

(21) Appl. No.: 18/462,321

(22) Filed: Sep. 6, 2023

(65) Prior Publication Data

US 2024/0073297 A1 Feb. 29, 2024

Related U.S. Application Data

(63) Continuation of application No. 17/806,231, filed on Jun. 9, 2022, now Pat. No. 11,792,299.

(51) Int. Cl.
*H04L 67/60* (2022.01)
*G06F 9/50* (2006.01)
(Continued)

(52) U.S. Cl.
CPC ............ *H04L 67/60* (2022.05); *G06F 9/5038* (2013.01); *H04J 3/0658* (2013.01); *H04J 3/0682* (2013.01); *H04L 63/0428* (2013.01); *H04L 67/14* (2013.01)

(58) Field of Classification Search
CPC ..... H04L 67/60; H04L 63/0428; H04L 67/14; H04L 12/1886; H04L 12/1881;
(Continued)

(56) References Cited

U.S. PATENT DOCUMENTS

| | | |
|---|---|---|
| 6,223,286 B1 | 4/2001 | Hashimoto |
| 8,654,790 B2 | 2/2014 | Haver et al. |

(Continued)

FOREIGN PATENT DOCUMENTS

| | | |
|---|---|---|
| DE | 102017216047 | 3/2019 |
| EP | 2592807 | 7/2014 |

(Continued)

OTHER PUBLICATIONS

U.S. Appl. No. 17/705,157, filed Mar. 25, 2022, Michael Alan Judge et al.

(Continued)

*Primary Examiner* — Cheikh T Ndiaye
(74) *Attorney, Agent, or Firm* — Alexander A. Knapp; Kowert, Hood, Munyon, Rankin & Goetzel, P.C.

(57) ABSTRACT

Various embodiments of apparatuses and methods for multicast, multiple unicast, and unicast distribution of messages with time synchronized delivery are described. In some embodiments, the disclosed system and methods include a reference timekeeper providing a reference clock to one or more host computing devices. The one or more host computing devices host compute instances, and also contain respective isolated timing hardware outside the control of the compute instances. The isolated timing hardware of the one or more host computing devices then receive respective packets, and obtain the same time to deliver the respective packets. Each isolated timing hardware provides either the packet, or information to access the packet, to its respective destination compute instance subsequent to determining that
(Continued)

the same specified time to deliver the packet has occurred. Thus, the respective packets are delivered near simultaneously to the one or more destination compute instances.

20 Claims, 16 Drawing Sheets

(51) Int. Cl.

| | |
|---|---|
| ***H04J 3/06*** | (2006.01) |
| ***H04L 9/40*** | (2022.01) |
| ***H04L 67/14*** | (2022.01) |

(58) Field of Classification Search
CPC ........ G06F 9/5038; G06F 1/14; H04J 3/0658; H04J 3/0682; H04J 3/0661
See application file for complete search history.

(56) References Cited

U.S. PATENT DOCUMENTS

| | | | |
|---|---|---|---|
| 8,701,209 | B2 | 4/2014 | Awata |
| 9,450,846 | B1 | 9/2016 | Huang et al. |
| 9,900,778 | B2 | 2/2018 | Chen et al. |
| 10,263,717 | B1 | 4/2019 | Suemitsu |
| 10,313,041 | B2 | 6/2019 | Butterworth et al. |
| 2004/0105549 | A1 | 6/2004 | Suzuki et al. |
| 2005/0036512 | A1 | 2/2005 | Loukianov |
| 2007/0110074 | A1 | 5/2007 | Bradley et al. |
| 2010/0008376 | A1 | 1/2010 | Bandholz et al. |
| 2013/0218549 | A1 | 8/2013 | Sultan et al. |
| 2016/0112182 | A1 | 4/2016 | Karnes |
| 2018/0359811 | A1 | 12/2018 | Verzun et al. |
| 2019/0044637 | A1 | 2/2019 | Gulstone |
| 2019/0349392 | A1* | 11/2019 | Wetterwald ......... H04L 43/0852 |
| 2021/0021520 | A1 | 1/2021 | Wetterwald et al. |
| 2021/0392064 | A1 | 12/2021 | Suzuki |
| 2022/0191148 | A1* | 6/2022 | Raindel ............... G06F 9/45558 |
| 2023/0006807 | A1 | 1/2023 | Hubbe |

FOREIGN PATENT DOCUMENTS

| | | |
|---|---|---|
| EP | 3654603 | 5/2020 |
| KR | 102476643 | 12/2022 |
| WO | 2020151806 A1 | 7/2020 |

OTHER PUBLICATIONS

Adams, Carlisle, et al., Internet X. 509 public key infrastructure time-stamp protocol (TSP), RFC 3161, Aug. 2001, pp. 1-79.
Ohri, Ajay, "Tunneling Protocol—A Complete Overview", URL: https://www.jigsawacademy.com/blogs/cyber-security/tunneling-protocol/, 2021, pp. 1-8.
U.S. Appl. No. 17/806,231, filed Jun. 9, 2022, Said Bshara et al.
International Search Report and Written Opinion mailed Oct. 12, 2023 in PCT/US2023/068104, Amazon Technologies, Inc., pp. 1-11.
IEEE Standards Committee, "IEEE PI588, Draft IEEE 1588-2019, IEEE Standard for a Precision Clock Synchronization Protocol for Networked Measurement and Control System", ITU-T Draft; Study Period 2017-2020; Study Group 15, International Telecommunication Union, Aug. 26, 2020, pp. 1-500, Geneva, downloaded from the internet.
U.S. Appl. No. 19/667,935, filed May 5, 2026, Judge, et al.

* cited by examiner

DISTRIBUTION OF MESSAGES WITH GUARANTEED OR SYNCHRONIZED TIME OF DELIVERY

PRIORITY APPLICATION

This application is a continuation of U.S. patent application Ser. No. 17/806,231, filed Jun. 9, 2022, which is hereby incorporated by reference herein in its entirety.

BACKGROUND

To facilitate increased utilization of computing resources, such as in a data center, virtualization technologies may be used to allow a single physical computing device to host one or more instances of virtual machines that appear and operate as independent computing devices to users. With virtualization, the single physical computing device can create, maintain, delete, or otherwise manage virtual machines in a dynamic manner. In turn, users of a virtualized computing service can request computer resources, including single computing devices or a configuration of networked computing devices, and be provided with varying numbers of virtual machine resources. These virtual machines may carry out a wide variety of functionalities otherwise possible on a non-virtualized hardware device, such as invoking network-accessible services, conducting data processing, and the like.

In some cases, senders of information, such as packets, may wish to perform a multicast or group communication. In a multicast, data transmission is addressed to a group of destination computers such that packets are sent at the same time or nearly at the same time from a sending entity or set of entities (e.g., computer or set of computers), but may arrive at different destination entities (e.g., computers) at different times depending on network conditions between the sending entity and receiving entities, among other factors. Multicast may either be application layer multicast, or network-assisted multicast, where the latter makes it possible for the sender to efficiently send to the group in a single transmission. For example, in network-assisted multicast, copies are automatically created in other network elements, such as routers, switches and cellular network base stations, but only in network segments that currently contain members of the group. Network assisted multicast may be implemented at the data link layer or at the Internet layer using IP multicast. In IP multicast the implementation of the multicast concept occurs at the IP routing level, where routers create optimal distribution paths for datagrams sent to a multicast destination address.

Figure 1A:
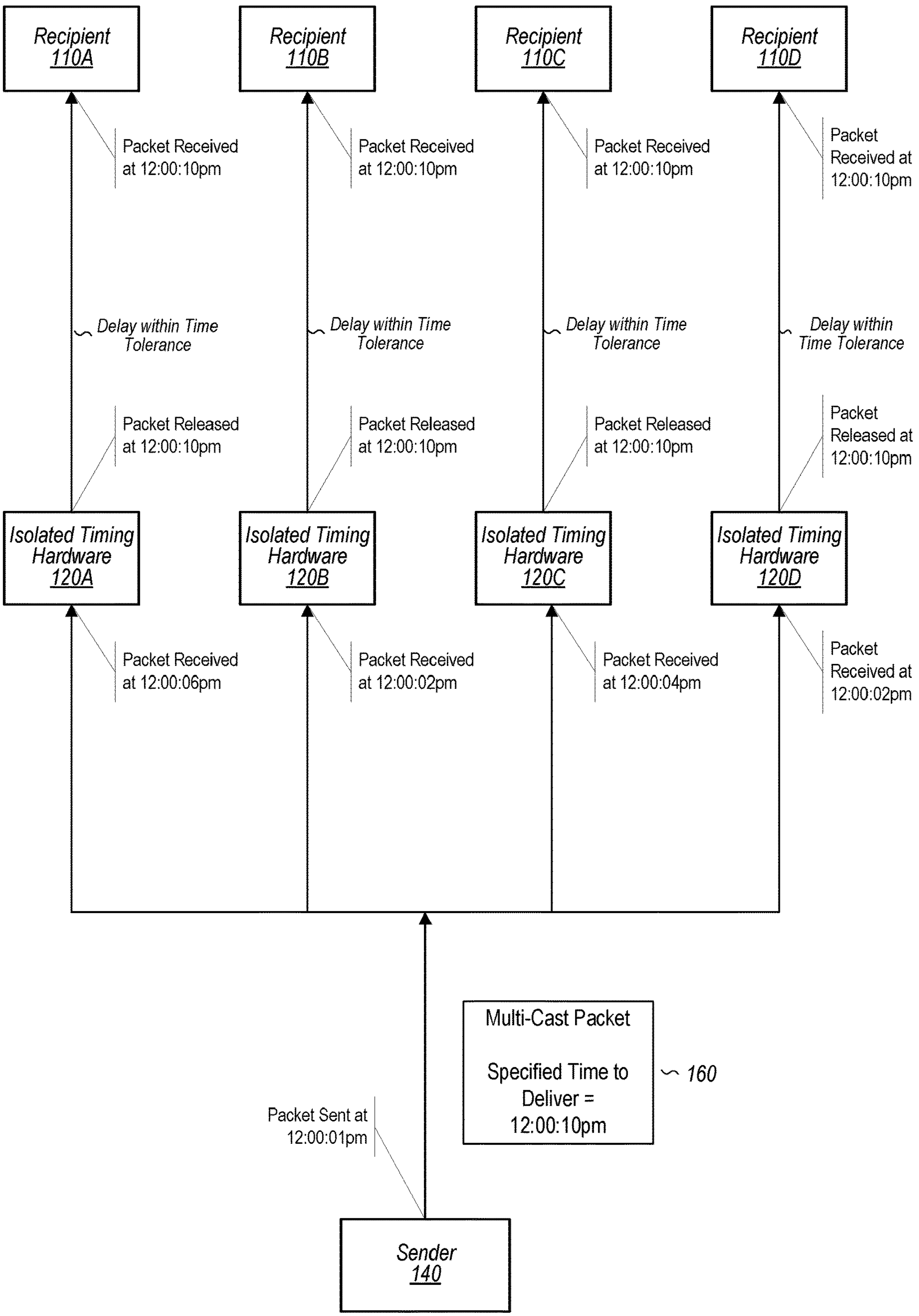
FIG. 1A depicts a logical model of a sender sending a multicast set of packets to a plurality of recipients, where the multicast packets include, or are associated with, a specified time to deliver the respective packets, where the packets arrive at a plurality of isolated timing hardware elements associated with the recipients at different times, and the respective isolated hardware elements release the respective packets to the respective recipients at the same specified time based on the delivery time specified for the multicast packets, such that the recipients receive the packet near simultaneously, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., a network interface card (NIC) or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION OF EMBODIMENTS

Embodiments of the systems and methods, as described herein, implement multicast, multiple unicast, and/or unicast distribution of messages with guaranteed delivery times and/or delivery time synchronization. The embodiments provide a time-to-deliver for a multicast, multiple unicast, and/or unicast packet defining the time it should be forwarded to the various users at the one or more receivers. Multicast in this application is a broad concept that encompasses both application layer multicast and network-assisted multicast, as well as any other type of near-in-time group communication of electronic messages and/or packets. A networking computing resource (such as isolated timing hardware) associated with one of the receivers receives this multicast, multiple unicast, and/or unicast packet such that it is outside the control the destination computing resource, such as a destination compute instance, in some embodiments. The networking computing resource uses this time-to-deliver information to deliver the packet to the user at the specific time-to-deliver time. Other networking computing resources associated with other receivers perform the same action, in the multicast and multiple unicast embodiments, such that the multiple packets are provided by the networking computing resources to the multiple users at the multiple destination compute instances within a time tolerance of the same specific time-to-deliver time, such that they are delivered near simultaneously, in some embodiments.

In some embodiments of the systems and methods described herein, a virtualized computing service may provide a multicast, multiple unicast, and/or unicast distribution of messages with guaranteed delivery times and/or delivery time synchronization service that operates across user accounts of a provider network. Some of these embodiments provide a feature or service to embed provider network provided time-to-deliver information on multicast, multiple unicast, and/or unicast packets that a sender sends (e.g., from a service such as a virtual exchange). In other embodiments, a sender application or OS associated with the sender will embed the time-to-deliver information on multicast, multiple unicast, and/or unicast packets that a sender sends. On the receiving side, isolated timing hardware associated with a receiving host computing device is provided a mechanism to access the time-to-deliver information and to compare it against an accurate time source, in some embodiments. Because the isolated timing hardware is included in the receiving host computing device or is located physically adjacent to the receiving host computing device and is further synchronized to a highly-accurate reference timekeeping device, a virtualized computing service comprising the isolated timing hardware can provide the multicast, multiple unicast, and/or unicast distribution of messages with guaranteed delivery times and/or delivery time synchronization from a port of a receiving compute instance implemented on a given receiving host computing device at a time that very accurately reflects the time-to-deliver information of a given packet. The isolated timing hardware can store the packets (and other packets sent from other senders with time-to-deliver information), such that the packets can be ordered based on the time-to deliver information, and delivered using a highly accurate time of delivery to guarantee a near simultaneous reception of the received packets across multiple receiving host computing devices.

The isolated timing hardware may be physically and logically positioned such that a received multicast, multiple unicast, and/or unicast packet being handled by the isolated timing hardware has not entered the control of the compute instance, and therefore cannot be altered by a user to whom the compute instance is allocated. For example, a service provider that provides a virtualized computing service may have exclusive access to a multicast, multiple unicast, and/or unicast packet that has been received by isolated timing hardware associated with a destination compute instance, such that the service provider can give a guarantee or an "attestation" that a destination compute instance cannot access the packet until it is provided to the destination compute instance. Only when the isolated timing hardware provides the packet or information to access the packet to the destination compute instance, can the destination compute instance access that packet. The isolated timing hardware, along with other receivers' isolated timing hardware, can use the time-to-deliver associated with a packet to deliver the packet to the intended destination at the specific time-to-deliver time. However, in order to deliver the packet accurately, the isolated timing hardware, in some embodiments, needs a fairly accurate clock, or at least a clock that is accurately synchronized with the other clocks of the other recipients to within any time tolerance for variability in delivery.

However, a known and long-standing problem within distributed computing systems is the difficulty in synchronizing time information between devices. Many computing devices utilize crystal oscillators to keep time. These oscillators, in theory, operate at a known frequency, and thus time can be measured by the signal provided by an oscillator. However, in practice the frequency of an oscillator varies based on various factors, such as operating temperature. While frequency variation may be minute, it can be sufficient to cause substantial desynchronization between two different devices. Another source of error in time synchronization is the mechanism by which two devices are synchronized. In general, synchronization becomes less accurate as devices are moved further apart, as the laws of physics dictate a maximum speed at which time information can move between devices, which speed is further reduced by various limitations of the equipment used to transmit data between devices. While time synchronization techniques can attempt to overcome this problem by adjusting for transmission time, this approach has its limits. For example, it cannot generally account for asymmetrical delays, where a round-trip communication time between two devices is unevenly split between outgoing and returning communication paths. In this case, a first device may receive time information from a second device, but may be unsure as to how much time has elapsed during transmission of the information from the second device to the first device. Moreover, such techniques generally cannot account for variance in transmission times, which may occur for example due to congestion on a network. Thus, time information is often inaccurate.

One large scale application where accurate time information may be desired is in hosted computing environments, sometimes referred to as "cloud computing" environments. One typical tenant of such environments is hardware commoditization: where users of such environments are often provided with a general outline of the hardware on which a hosted compute instance will execute, but are relieved of selecting and maintaining individual hardware. In the context of cloud computing, time synchronization becomes particularly problematic, as hosted computing environments often span multiple data centers within a given geographic region and multiple geographic regions around the globe. If such environments attempt to provide synchronization among all hosted compute instances, there may be an expectation that such synchronization does not depend on the particular hardware hosting the instance, the particular location of that hardware, or the like. Accordingly, given the limitations to time synchronization noted above, providing accurate time information across a hosted computing environment is very difficult, and inaccuracies can occur.

Highly accurate clocks are critical for a variety of applications, such as financial transactions requiring accurate time-stamping to support and audit fair and equal access regulatory requirements. For example, European Union MiFID II regulations require accuracy within 100 microseconds for many trading applications. In addition, a typical requirement for equity exchanges is that they provide fair and equal access to market information. However, in current multicast and/or multiple unicast implementations, information, such as packets, sent from a sender arrive at the various packet recipients at different times. For example, varying network latencies, varying network configurations, varying geographical distances, etc. between a packet sending computing resource and a packet receiving computing resource causes a multicast and/or multiple unicast packets to arrive at a first packet recipient at a different time than arrival time of the multicast and/or multiple unicast packets at a second packet recipient. In some applications, such time arrival variabilities may be inconsequential. However, in other applications such differences may be consequential. For example, financial markets require (or are required by regulators) to ensure that information arrives to market participants in a near simultaneous manner. Financial markets currently take tremendous efforts to physically equalize network delay between market participants, down to ensuring that network cables are of equal length to the market participants, to ensure that one market participant does not receive information before another, thus giving them an unfair advantage. This takes tremendous cost and effort and requires highly specifically tailored computer networks and systems that are tightly controlled and that cannot be ported into other networks or systems. In datacenters and provider networks, these mechanisms need to be replaced by something that works in a more loosely coupled virtual environment.

One mechanism for addressing these problems would be to equip every computing device with a highly accurate reference timekeeping device. For example, each device may have installed within it an atomic clock, which is manually synchronized with an initial reference point (e.g., by physically co-locating the atomic clock and the reference point). Alternatively, each device may have installed a GNSS receiver configured to determine a present time by reference to a GNSS. Neither approach is feasible at large scale, both due to the cost and complexity of these time keeping devices and the logistical problems with setting up and maintaining such devices.

Some embodiments of the present disclosure address the above-noted problems by providing highly accurate time information at hosted compute instances in a manner that does not require a per-instance reference timekeeping device and that preserves flexibility of the hosted computing environment by requiring little or no modification to operation of hosted compute instances. These embodiments can provide highly accurate time information, such that the clock of a piece of isolated timing hardware included in (or associated with) a host computing device (that hosts the compute instance) can be used for determining when it is time to deliver a packet to a destination compute instance (e.g., at a specified delivery time associated with a received packet). Moreover, the service provider network may synchronize isolated timing hardware across multiple host computing devices within microseconds or nanoseconds to a reference timekeeping device (and thus, within microseconds or nanoseconds of other pieces of isolated timing hardware included in or associated with other host computing devices that are also synchronized to the reference timekeeping device). In some embodiments, the time tolerance for future delivery of multicast and/or multiple unicast packets can be determined by how closely the clocks of the various isolated timing hardware associated with the various destination host computing devices are synchronized.

More specifically, some embodiments of the present disclosure provide for one or more reference time keeping devices within a data center to be synchronized with isolated timing hardware of (or associated with) host computing devices in the data center by use of a dedicated time information network, used exclusively for transmission of time information. The dedicated time network may provide highly accurate (e.g., to the nanosecond level) time information to isolated timing hosting hardware of host computing devices. Embodiments provide a time-to-deliver for a multicast, multiple unicast, and/or unicast packet defining the time it should be forwarded to the various user(s) at the one or more receiver(s). A networking computing resource (such as isolated timing hardware) associated with one of the receivers receives this multicast, multiple unicast, and/or unicast packet such that it is outside the control of the destination computing resource, such as a destination compute instance, in some embodiments. This networking computing resource can be located on a network interface card (NIC) of the hosting hardware, in some embodiments. The networking computing resource uses this time-to-deliver to deliver the packet to the user at the specific time-to-deliver time. Other networking computing resources associated with other receivers perform the same action (e.g., at a same specified time-to-deliver), in the multicast and multiple unicast embodiments, such that the multiple packets are provided by the networking computing resources to the multiple users at the multiple destination compute instances within a time tolerance of the same specific time-to-deliver time, such that they are delivered near simultaneously, in some embodiments.

The computing resource associated with the sender that calculates the time-to-deliver for a multicast, multiple unicast, and/or unicast packet can be different, depending on the embodiment. In some embodiments, it can be the sending application, or the OS associated with the sending application. In other embodiments, it can be the isolated timing hardware associated with a sending host computing device that is hosting a sending compute instance that is sending the multicast, multiple unicast, and/or unicast packets. In still other embodiments, it can be a service, such as a service of a provider network, which the application that is sending multicast, multiple unicast, and/or unicast packets communicates with, such as through an API. In some embodiments, one computing resource can determine the time delta from the current time to a future time for the time-to-deliver and other computing resource can add the time delta to the current time to set the specific future time-to-deliver information. For example, a sending application might determine a delta into the future to deliver the packet, and might communicate that delta to associated isolated timing hardware. The isolated timing hardware can then calculate the time to deliver by adding the delta to the current time from its accurate hardware clock to determine a future time (e.g., time-to-deliver) to indicate for delivery of the packet at a recipient device. The computing resource associated with the sender that calculates the time-to-deliver for a packet can be configured in various ways in other embodiments, and the above examples should not be construed to be limiting. This sending computing resource can calculate the time-to-deliver for a multicast, multiple unicast, and/or unicast packet, in some embodiments, by using the longest network latency for the plurality of recipients, and then adding additional time to account for any network variability in delivery time, and then add the total waiting time to the current clock time to get a "future" time-to deliver.

There is no guarantee that a multicast, multiple unicast, and/or unicast packet will reach all the intended recipients. A packet might get dropped, might get corrupted, or a receiving device might have their queue full at the time the packet arrives. Therefore, in some embodiments, the sending computing resource can also get feedback information regarding whether any of the previously sent multicast, multiple unicast, and/or unicast packets arrived late at any of the intended recipients (or never arrived). The feedback mechanisms can be implemented in the system or exposed to the client. If, for example, a packet was sent at t=0, with a time-to-deliver at time t=10, and most of the recipients receive the packet by at least t=3, but one recipient gets its packet at t=11, then the feedback mechanism can tell the sending computing resource that one of the sent multicast, multiple unicast, and/or unicast packets recently arrived late. Delivery rates can be monitored quite closely, in some of these embodiments, and time-to-deliver values can be adjusted for future multicast, multiple unicast, and/or unicast packets based on the feedback information.

Recipients can provide feedback to the sending computing resource either with every packet, or periodically, or after a number of packets have been processed. This feedback can include statistics information. This feedback mechanism can allow a user, such as a financial market, to guarantee the market participants that a high percentage of market messages will be delivered simultaneously to all the market participants. The feedback mechanism can be an optional feature, in some embodiments, and can be enabled through an API, in some of these embodiments.

However, no isolated timing hardware on the receiving side would need to wait beyond the specified time-to-deliver time to deliver the packet to its intended recipient, in some embodiments. In these embodiments, there is no delivery confirmation message, for example, that is sent back from the recipients to the sender to confirm that the messages were received before they are released. These confirmation messages introduce further delay and more complexities regarding how long to wait for confirmation messages, and when to determine that an absent recipient is no longer part of a group, that these embodiments avoid by not employing a confirmation message condition for releasing of packets. Instead, the feedback is regarding the timing of multicast, multiple unicast, and/or unicast packets that were actually delivered, including statistical information and whether any packets arrived after the time-to-deliver time. Though in some embodiments, confirmation messages may be used without conditioning time of delivery on receipt of such conformation messages.

The sending computing resource is not required to be part of the same provider network as the receiving computing devices. The packet can simply be sent in a format that the isolated timing hardware associated with the receiving host computing devices recognizes as a multicast, multiple unicast, and/or unicast packet that has time-to-deliver information associated with it. The packets might be sent to an agreed upon destination port at the receiving host computing device, for example, in order to be recognized as a multicast, multiple unicast, and/or unicast packet that has time-to-deliver information associated with it. The time-to-deliver information can be included with the packet, or sent separately from the packet, depending on the embodiment. The isolated timing hardware (such as associated with a receiving host computing device) does not have to be part of a network that is controlled by a trusted authority, however, in some embodiments, it may be. In the financial markets use case, for example, market participants (such as brokerages) receive market updates routinely from the financial market. In this use case, the computing devices associated with the trusted authority ensure that there is no way that the market participants can access those updates early. Either the packets associated with the updates, or information to access inaccessible packets (such as keys for encrypted packets), have to wait inside the secure system, such as the isolated timing hardware associated with the receiving host computing devices, until the specified time to deliver has been reached.

The networking computing resource (such as the isolated timing hardware) associated with the receiving side can implement a data structure, such as a queue, to either hold packets, or hold information to access delivered or soon-to-be delivered inaccessible packets (such as encrypted packets), when the time-to-deliver those packets has not yet occurred. The data structure, such as the queue, might have an associated manager to manage the entries in the data structure. The data structure can be implemented in hardware or in software, depending on the embodiment. An identifier can identify these types of multicast, multiple unicast, and/or unicast packets before the packets (or the information to access an inaccessible packet) are placed in the data structure. In some embodiments, packets are encrypted (such as by the networking computing resource) and delivered to the destination before the time-to-deliver time, with the decryption key being stored in the data structure and provided to the destination at the time-to-deliver time. A time monitor can monitor the time and can deliver the stored packets (or the stored information to access the packets), or can signal a data structure or data structure manager to deliver the stored packets or information, at the time-to-deliver time.

In some embodiments, the hardware associated with each host computing device that is used to provide time information, receive a multicast, multiple unicast, and/or unicast packet, obtain a specified time to deliver the packet, and provides either the packet or information to access the packet at the specified time, is distinct from hardware used to host any receiving compute instances. For example, the hardware (e.g., isolated timing hardware) used to provide the time information, receive the multicast, multiple unicast, and/or unicast packet, obtain the specified time to deliver the packet, and provide either the packet or the information to access the packet at the specified time, may be a physical offload card connected to other hardware of the host computing device via a Peripheral Component Interconnect (PCI) Express bus. The offload card may include independent computing resources, such as an independent processor and memory, to avoid contention for resources with hosted compute instances. In other embodiments, the hardware might be a switch communicatively coupled to the host computing device, such as a top-of-rack ("TOR") switch.

The TOR switch may include its own independent computing resources, such as an independent processor and memory. In some cases, a portion of these resources may be dedicated to processing of multicast, multiple unicast, and/or unicast packets, to further avoid potential issues related to resource contention. In other embodiments, the ultimate receiver might be outside of the network with the hardware that is used to provide time information, receive multicast, multiple unicast, and/or unicast packet, obtain a specified time to deliver the packet, and provide either the packet or information to access the packet at the specified time. In these cases, the hardware might be located in an edge router, and the multicast, multiple unicast, and/or unicast packet is released from the edge router to the ultimate destination at the time-to-deliver time.

Some embodiments of the systems and methods provide highly accurate time information for multicast, multiple unicast, and/or unicast distribution of messages by using methods of time synchronization of isolated timing hardware that improves local clock accuracy to within microseconds (or nano-seconds) of a given time, such as UTC time. With reliable, at-scale microsecond-range clock accuracy and network packet time synchronization in provider networks, users can migrate and modernize their most time-sensitive applications using a cloud-computing provider. Additionally, users may be able to easily audit if any system providing highly accurate time information for time synchronization is working and providing the expected microsecond-range accuracy.

More specifically, some embodiments of the present disclosure provide for data centers including two distinct communication networks: a first packetized data network supporting standard network communications of instances, and a second network dedicated to providing highly accurate synchronized time information, such as a pulse-per-second signal. The dedicated time network may include one or more reference timekeeping devices configured to provide highly accurate time information, such as by synchronization to a global navigation satellite system (GNSS), like the global positioning system (GPS). Host computing devices within a data center may be provisioned with isolated timing hardware that accepts time information from the dedicated time network and uses that time information to maintain highly accurate time relative to the reference timekeeper. The isolated timing hardware may further provide a trusted mechanism to time-stamp packets using the highly accurate time information. Because time information is provided by hardware local to the hosted instances, and need not traverse a network external to the host, the time information may be highly accurate relative to traditional NTP, such as within 100 microseconds, within 20 microseconds, or less. Further, embodiments of the present disclosure can provide for multiple dedicated time networks, and for selection of a network to be used for time information based on analysis of those networks, further increasing accuracy in timekeeping.

As disclosed herein, a data center may include a number of host computing devices interconnected via a non-dedicated, packet-switched communication network. Each host computing device may host one or more compute instances, which may include virtual compute instances (e.g., with virtualized hardware provided by software executing on the host device, such as a hypervisor) or a bare metal instance (e.g., an instance with direct access to hardware of the host computing device). Compute instances may communicate via the non-dedicated network and with a wider network, such as the Internet. In addition, in some embodiments, a data center may include one or more dedicated networks carrying time information. In other embodiments, time information can be carried by the regular data network of the data center. Illustratively, each dedicated time network may be connected to a reference timekeeper device, such as a GNSS-connected timing device. The reference timekeeper device may transmit a PPS signal (or other fixed-width signal) via the dedicated time network, which may thus be broadcast to receiving devices on the network. The dedicated time network of some embodiments can be configured to maintain an extremely high level of accuracy for the time information, potentially on the order of tens of microseconds or nanoseconds. For example, the dedicated time network may implement the Synchronous Ethernet (SyncE) standard to maintain synchronization between devices of the network, or may implement designs and protocols of the White Rabbit Project, a network design known in the art that itself utilizes SyncE, to facilitate distribution of time information. Each host computing device may include hardware that interfaces with and receives the signal from the dedicated time network, thus facilitating synchronization between the host computing device and the reference timekeeping device. For example, such hardware may include a networking computing resource, such as isolated network hardware, included in the host computing device or physically adjacent to the host computing device. In some embodiments, the isolated timing hardware may include a network interface card (NIC) and one or more sockets that perform packet encapsulation and/or packet encryption. In one embodiment, the dedicated time network carries a PPS (or other fixed-width) signal from a reference time keeper exclusively, which signal is aligned to the relevant time boundary (e.g., which pulses at the correct second boundary). Accordingly, to determine a current time, it may be necessary for the hardware (e.g., isolated timing hardware) also to obtain a reference point, indicating which second it currently is. As this reference point need not be highly accurate in order to achieve synchronization, the hardware (e.g., isolated timing hardware) may obtain the reference point via the non-dedicated network, such as via communication with an NTP server on the non-dedicated network. The hardware (e.g., isolated timing hardware) may then determine the current time to a high degree of accuracy by combining the reference point with second boundary indicated by the PPS signal. Moreover, the hardware (e.g., isolated timing hardware) may provide an indication of the current time to a timestamp creation component for use in time stamping packets transmitted by one or more computing instances implemented on the host computing device.

In some embodiments, a dedicated time network may include multiple reference timekeeping devices, each of which for example transmits PPS (or other fixed-width) signals among a portion of the network. One or more devices within the dedicated time network may be configured to select among the signals provided by each timekeeping device in order to identify a "lead" signal to follow as a source of time. Illustratively, host computing devices in a data center may be physically arranged into units, such as racks. Each rack may include a switch on the dedicated time network with logic to select among multiple signals, each provided by a different reference timekeeping device. The switch may include hardware, such as a field-programmable gate array (FPGA), that can be configured to provide at very low latency a selected signal to each host computing device on the unit. Accordingly, the switch may inspect the available signals, select an appropriate signal, and reconfigure the FPGA to provide the signal to the devices of the unit. To facilitate seamless operation, the switch may include multiple FPGAs, such that a first FPGA can continue to send time information from a prior reference timekeeping device while a second FPGA is configured to send such time information from a new reference timekeeping device.

In one embodiment, the switch selects a reference time signal based on a consensus algorithm. For example, if a majority (or other consensus threshold) of signals occur within a threshold period, the switch may select a signal from that set (e.g., an earliest, latest, closest to average, etc.) to provide to host computing devices of the unit. In another embodiment, the switch selects a reference timekeeping device based on metadata regarding the reference timekeeping devices, the dedicated time network, or a combination thereof. For example, a data center may include a computing device configured to conduct timekeeping analysis to detect delays or other issues that may prevent a reference timekeeping device from delivering an accurate signal. The analysis device may deliver such information to a per-unit switch to facilitate signal selection. While signal selection is discussed herein with respect to a per-unit switch, in some cases other elements of the dedicated time network, including isolated timing hardware of host computing devices, may conduct such signal selection.

As will be appreciated by one of skill in the art in light of the present disclosure, the embodiments disclosed herein improve the ability of computing systems to provide multicast, multiple unicast, and/or unicast distribution of messages with guaranteed delivery times and/or delivery time synchronization by providing a time-to-deliver with messages to trusted receiving network computing devices. The packets and the time-to-deliver are outside the control of the receiving compute instances, and consequently outside the control of the users, so that other users, or other entities outside of a datacenter or provider network, can "trust" that the messages cannot be accessed by users until the time-to-deliver has occurred. In addition, the embodiments disclosed herein improve the ability of computing systems to provide highly accurate time information to hosted compute instances without requiring specialized configuration of such hosted compute instances. Moreover, the presently disclosed embodiments address technical problems inherent within computing systems; specifically, the difficulty of establishing a common notion of time within a distributed computing system with a high degree of accuracy, the difficulty of providing highly accurate time information across a fleet of distributed computing devices, and the difficulty of providing multicast, multiple unicast, and/or unicast distribution of messages with guaranteed delivery times and/or delivery time synchronization that operates across user accounts. These technical problems are addressed by the various technical solutions described herein, including (a) the use of isolated timing hardware associated with a host computing device to synchronize to a reference timekeeper device by use of a data network or a dedicated time network; (b) the use of the isolated timing hardware to only provide packets (or access to inaccessible packets) to multiple users at multiple destination compute instances within a time tolerance of the same specific time-to-deliver time, such that they are delivered near simultaneously, in some embodiments; (c) the use of the isolated timing hardware to keep the packets (or information to access the packets) outside the control of any compute instances and consequently any users before the time-to-deliver has occurred, and (d) the use of the isolated timing hardware to provide a local interface for time information to hosted compute instances. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

FIG. 1A depicts a logical model of a sender 140 sending a multicast packet 160 to a plurality of recipients (110A-110D). The multicast packet 160 is sent at 12:00:01 μm and includes a specified time to deliver the packet, which is 12:00:10 pm in the example of FIG. 1A. The times in this figure are very coarse for simplicity, being specified only in seconds, but in actuality would be specified down to the microseconds and possibly nanoseconds. FIG. 1A shows a plurality of isolated timing hardware devices (120A-120D), each associated with its respective recipient (110A-110D). As explained previously, the isolated timing hardware devices (120A-120D) may be respective physical offload cards connected to other hardware of respective host computing devices via a Peripheral Component Interconnect (PCI) Express bus. In other embodiments, the isolated timing hardware devices (120A-120D) might be included in one or more switches, such as a top-of-rack ("TOR") switch, communicatively coupled to a receiving host computing device that hosts a recipient. In other embodiments, the ultimate recipient (110A-110D) might be outside of a provider network that would include the isolated timing hardware (120A-120D). In these cases, the isolated timing hardware (120A-120D) might be located in an edge router of the provider network, and the multicast packet would be released from the edge router to the ultimate recipient (110A-110D) at the time-to-deliver time.

Referring to FIG. 1A, the multicast packet 160 arrives at the plurality of the isolated timing hardware (120A-120D) at different times. For example, the multicast packet 160 arrives at isolated timing hardware 120A at 12:00:06 pm, arrives at 120B at 12:00:02 pm, arrives at 120 C at 12:00:04 pm and arrives at 120D at 12:00:02 pm. The isolated timing hardware (120A-120D) receives the multicast packet 160, obtain the specified time to deliver the packet, which in this case is 12:00:10 μm, and provides either the packet or information to access the packet at the specified time. Therefore, each isolated timing hardware (120A-120D) releases the multicast packet to its respective recipient at the same specified time of 12:00:10 pm to deliver the packet, such that the recipients receive the packet near simultaneously at 12:00:10 pm, since the delay between the isolated timing hardware and the recipient is within a time tolerance. Therefore, the multicast packets are provided by the multiple isolated timing hardware to their respective recipients within a time tolerance of the same future specified time to deliver the packet in this embodiment.

Figure 1B:
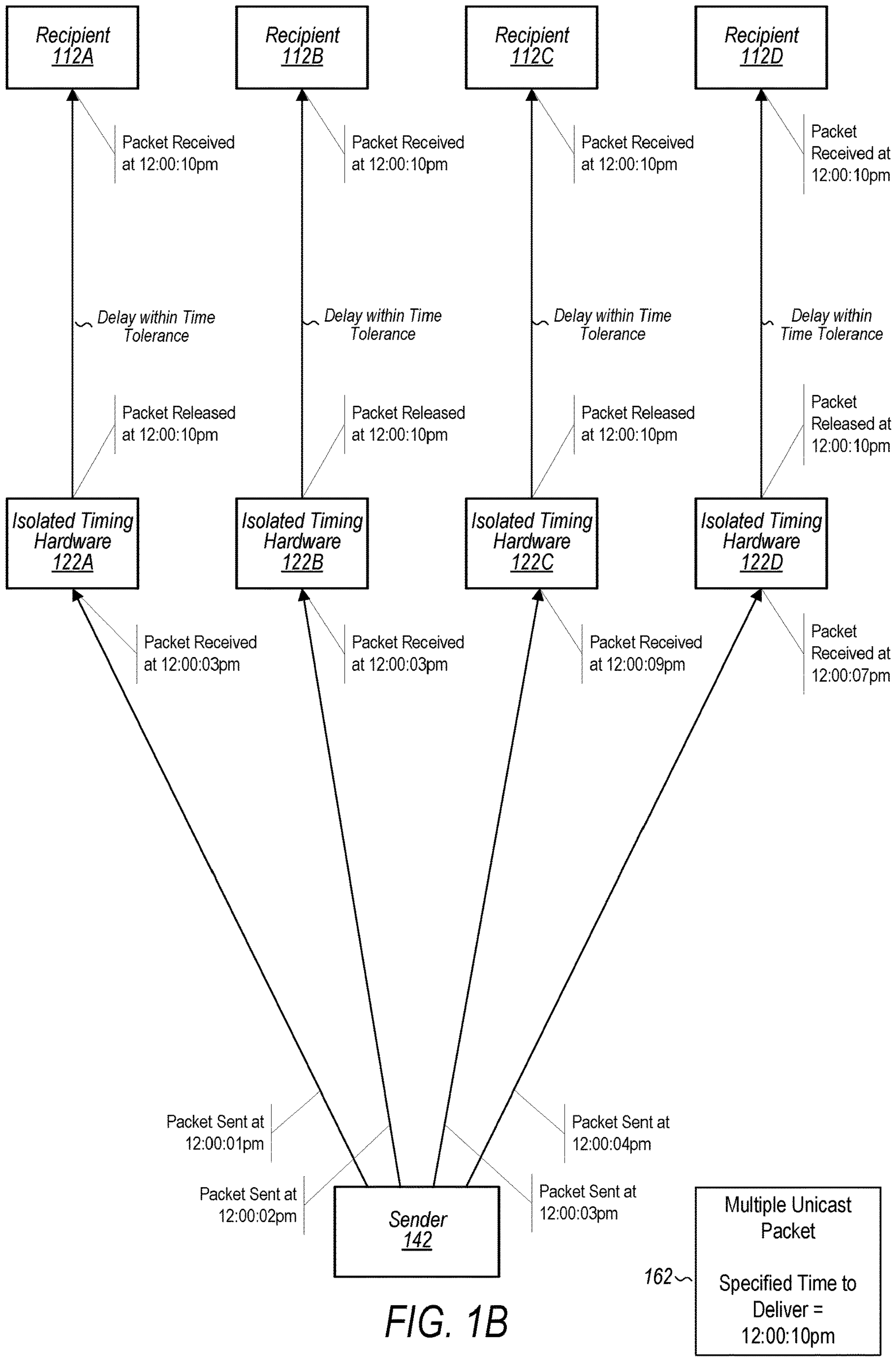
FIG. 1B depicts a logical model of a sender sending a multiple unicast set of packets to a plurality of recipients, where the multiple unicast packets include, or are associated with, a specified time to deliver the respective packets, where the packets arrive at a plurality of isolated timing hardware elements associated with the recipients at different times, and the respective isolated hardware elements release the respective packets to the respective recipients at the same specified time based on the delivery time specified for the multiple unicast packets, such that the recipients receive the packet near simultaneously, according to some embodiments.

FIG. 1B depicts a logical model of a sender 140 sending a multiple unicast packet 162 to a plurality of recipients (112A-112D). The multiple unicast packets 162 are sent at different times (12:00:01 pm, 12:00:02 pm, 12:00:03 pm, 12:00:04 pm) and includes a specified time to deliver the packet, which is 12:00:10 pm in the example of FIG. 1B. The times in this figure are very coarse for simplicity, being specified only in seconds, but in actuality would be specified down to the microseconds and possibly nanoseconds. FIG. 1B shows a plurality of isolated timing hardware devices (122A-122D), each associated with its respective recipient (112A-112D). As explained previously, the isolated timing hardware devices (122A-122D) may be respective physical offload cards connected to other hardware of respective host computing devices via a Peripheral Component Interconnect (PCI) Express bus. In other embodiments, the isolated timing hardware devices (122A-122D) might be included in one or more switches, such as a top-of-rack ("TOR") switch, communicatively coupled to a receiving host computing device that hosts a recipient. In other embodiments, the ultimate recipient (112A-112D) might be outside of a provider network that would include the isolated timing hardware (122A-122D). In these cases, the isolated timing hardware (122A-122D) might be located in an edge router of the provider network, and the multicast packet would be released from the edge router to the ultimate recipient (112A-112D) at the time-to-deliver time.

Referring to FIG. 1B, the multiple unicast packets 162 arrive at the plurality of the isolated timing hardware (122A-122D) at different times. For example, the multiple unicast packet 162 arrives at isolated timing hardware 122A at 12:00:03 pm, arrives at 122B at 12:00:03 pm, arrives at 122 C at 12:00:09 pm and arrives at 122D at 12:00:07 pm. The isolated timing hardware (122A-122D) receives the multiple unicast packet 162, obtains the specified time to deliver the packet, which in this case is 12:00:10 μm, and provides either the packet or information to access the packet at the specified time. Therefore, each isolated timing hardware (122A-122D) releases respective ones of the multiple unicast packets to its respective recipient at the same specified time of 12:00:10 pm to deliver the packet, such that the recipients receive the packet near simultaneously at 12:00:10 pm, since the delay between the isolated timing hardware and the recipient is within a time tolerance. Therefore, the multiple unicast packets are provided by the multiple isolated timing hardware to their respective recipients within a time tolerance of the same future specified time to deliver the packet in this embodiment.

Figure 1C:
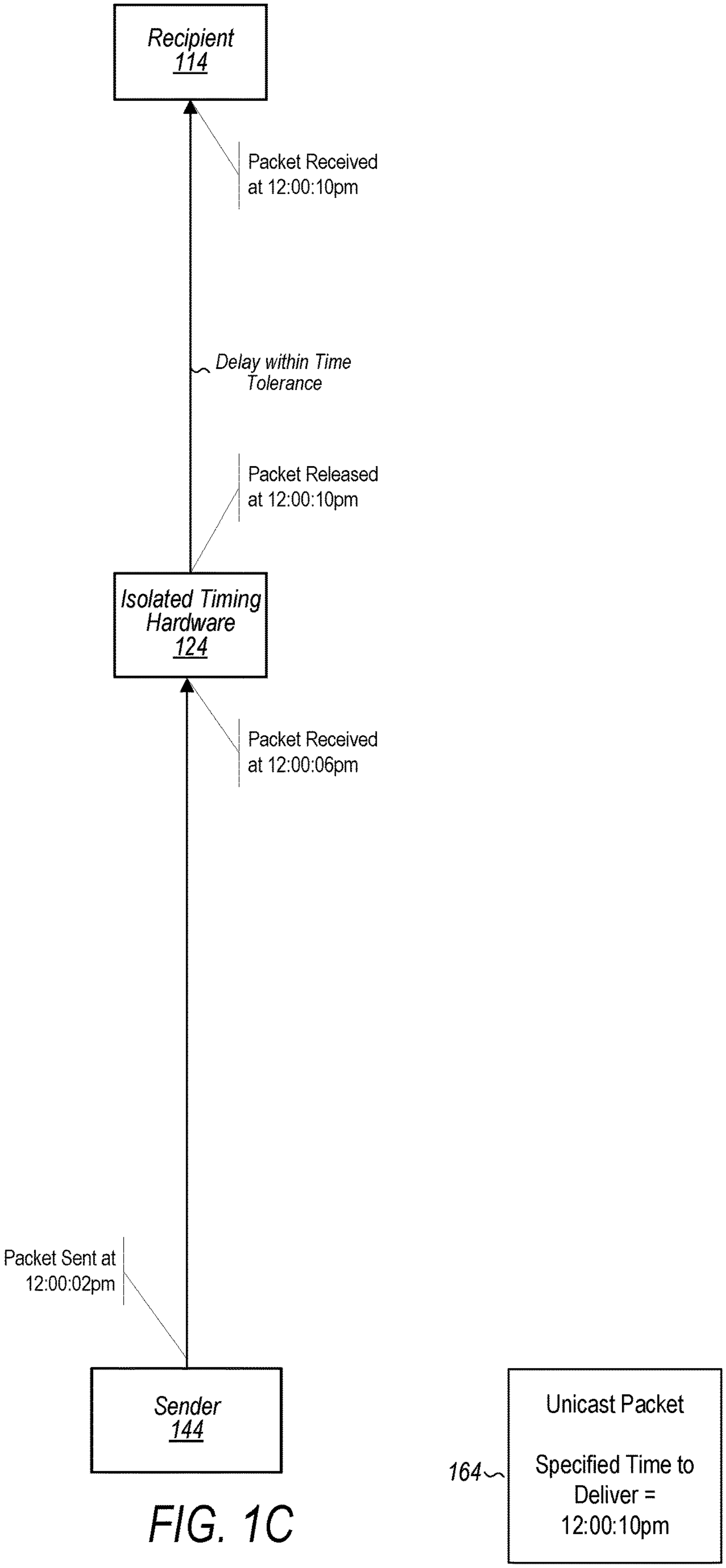
FIG. 1C depicts a logical model of a sender sending a unicast packet to a recipient, where the unicast packet includes, or is associated with, a specified time to deliver the packet, where the packet arrives at an isolated timing hardware element associated with the recipient, and the isolated hardware element releases the packet to the recipient based on the delivery time specified for the unicast packet, according to some embodiments.

FIG. 1C depicts a logical model of a sender 144 sending a unicast packet 164 to a recipient (114). The unicast packet 164 is sent at 12:00:02 pm, and includes a specified time to deliver the packet, which is 12:00:10 pm in the example of FIG. 1C. The times in this figure are very coarse for simplicity, being specified only in seconds, but in actuality would be specified down to the microseconds and possibly nanoseconds. FIG. 1C shows an isolated timing hardware device (124), associated with its recipient (114). As explained previously, the isolated timing hardware device (124) may be a physical offload card connected to other hardware of the host computing device via a Peripheral Component Interconnect (PCI) Express bus. In other embodiments, the isolated timing hardware device (124) might be included in one or more switches, such as a top-of-rack ("TOR") switch, communicatively coupled to a receiving host computing device that hosts a recipient. In other embodiments, the ultimate recipient (114) might be outside of a provider network that would include the isolated timing hardware (124). In these cases, the isolated timing hardware (124) might be located in an edge router of the provider network, and the unicast packet would be released from the edge router to the ultimate recipient (114) at the time-to-deliver time.

Referring to FIG. 1C, the unicast packet 164 arrives at the isolated timing hardware (124) at 12:00:06 pm. The isolated timing hardware (124) receives the unicast packet 164, obtains the specified time to deliver the packet, which in this case is 12:00:10 μm, and provides either the packet or information to access the packet at the specified time. Therefore, the isolated timing hardware (124) releases the unicast packet to its recipient at the same specified time of 12:00:10 pm to deliver the packet, such that the recipient receives the packet near 12:00:10 pm, since the delay between the isolated timing hardware and the recipient is within a time tolerance. Therefore, the unicast packets are provided by the isolated timing hardware to its respective recipient within a time tolerance of the same future specified time to deliver the packet in this embodiment.

Figure 2:
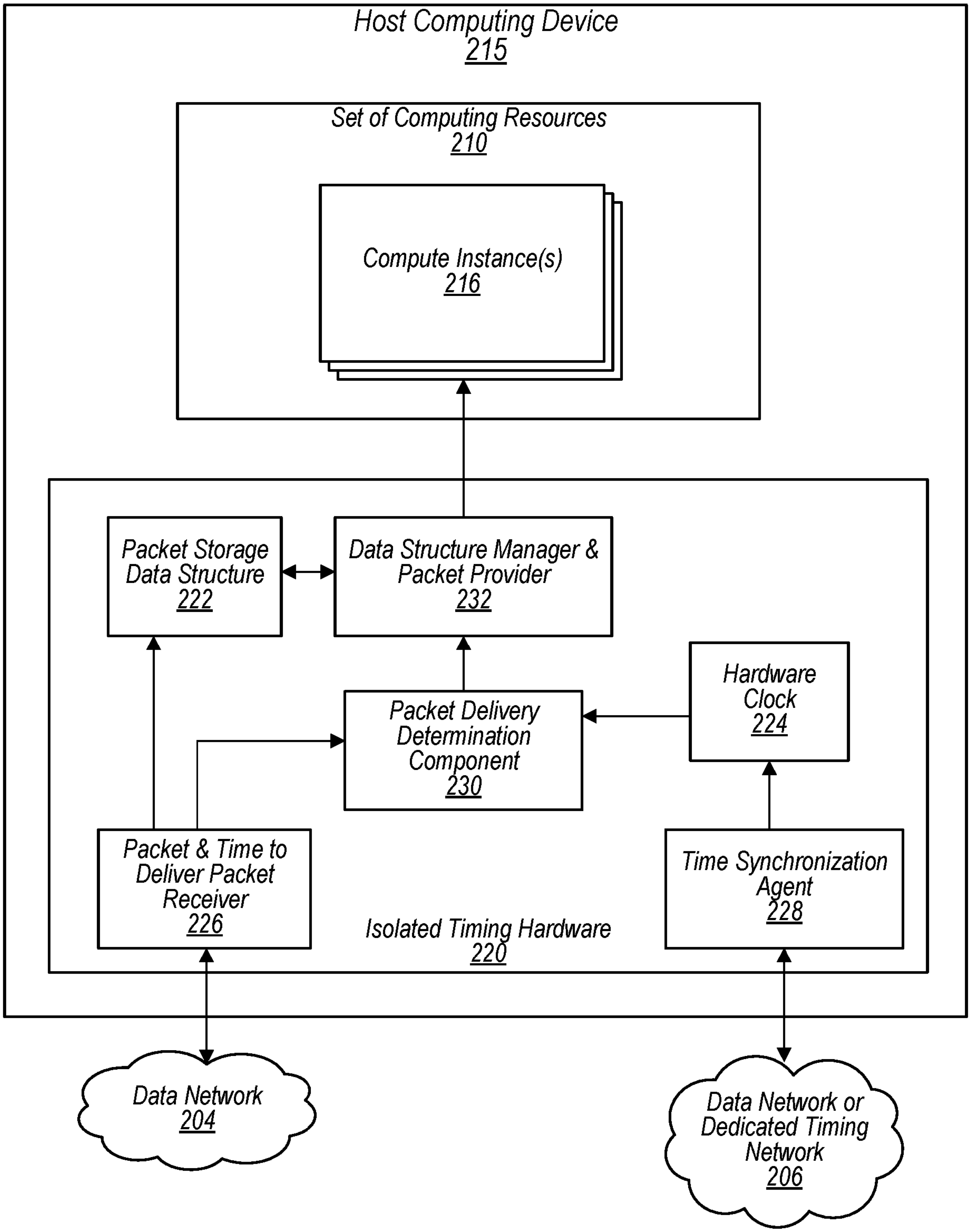
FIG. 2 depicts a logical model of a receiving host computing device configured to participate in multicast, multiple unicast, and/or unicast distribution of messages with time guaranteed and/or synchronized delivery, where the receiving host computing device hosts compute instances using a set of computing resources and also comprises isolated timing hardware that is outside the control of the compute instances. Additionally, a time synchronization agent synchronizes a hardware clock of the isolated timing hardware using a dedicated timing network. Also, the isolated timing hardware comprises a packet & time to deliver packet receiver configured to receive a packet from a data network and provide the packet to a packet storage data structure. Moreover, a packet delivery determination component of the isolated timing hardware is configured to determine when to deliver the packet based on the hardware clock and the specified delivery time indicated for the packet and notifies a data structure manager/packet provider to deliver the packet from the data structure to a compute instance hosted on the host computing device at the specified time for delivery as indicated for the packet, according to some embodiments.

FIG. 2 depicts an example host computing device 215 in which embodiments of the present disclosure can be implemented. FIG. 2 depicts a logical model of a host computing device 215 providing for multicast, multiple unicast, and/or unicast distribution of messages with guaranteed delivery times and/or delivery time synchronization at the receiving host computing device. The host computing device 215 hosts compute instances 216 using a set of computing resources 210. The host computing device 215 of this embodiment also comprises networking computing resources, such as isolated timing hardware 220, that is outside the control of the compute instances 216. In some embodiments the isolated timing hardware 220 is part of the host computing device 215, such as being part of the chassis, for example. In some of these embodiments, the isolated timing hardware 215 might be embedded within a network interface card (NIC). In other embodiments, the isolated timing hardware 220 is a completely separate entity from the host computing device 215. A time synchronization agent 228 synchronizes a hardware clock 224 using information from a data network or a dedicated timing network 206. If 206 is a data network, the data network 206 can be the same data network as 204, or a different data network. If it is a dedicated timing network 206, then the dedicated timing network 206 is a different network than the data network 204.

A packet & time-to-deliver packet receiver 226 receives a packet from a data network 204. The receiver 226 provides the packet to a packet storage data structure 222, possibly through the data structure manager 232. The data structure is managed by the data structure manager/packet provider 232. The receiver 226 also provides the time-to-deliver information to the packet delivery determination component 230, in some embodiments. The packet delivery determination component 230 determines when to deliver the packet based on the time-to-deliver information and the hardware clock 224. The packet delivery determination component 230 notifies a data structure manager/packet provider 232 to deliver the packet from the data structure 222 to a destination compute instance 216 at the appropriate time, according to some embodiments.

Therefore, the networking computing resource, such as the isolated timing hardware 220, is coupled to a host computing device 215 that hosts one or more compute instances 216. The packet receiver 226 of networking computing resource receives a packet from a sender through the data network 204 at a first reception time. The received packet comprises a packet destination of a particular compute instance of the one or more compute instances 216. The received packet is not accessible to the particular compute instance. The networking computing resource, such as the isolated timing hardware 220, obtains either from the packet or from information separate from the packet, a specified time to deliver the packet, wherein the specified time to deliver the packet is outside the control of the particular compute instance. The networking computing resource, such as the isolated timing hardware 220, provides either the packet or information to access the packet through the packet provider 232 to the particular compute instance subsequent to determining, by the packet delivery determination component 230, that the specified time to deliver the packet has occurred.

Figure 3:
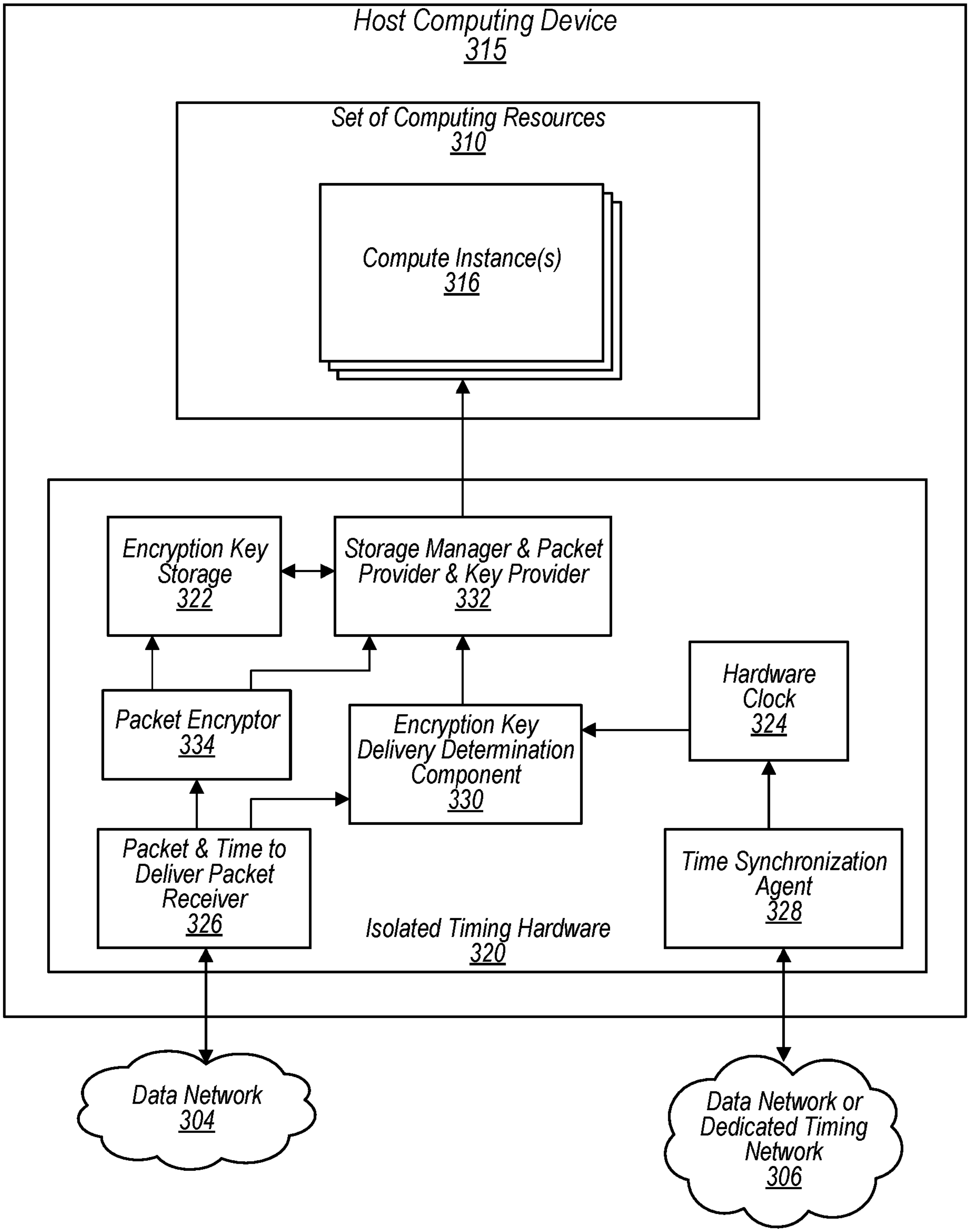
FIG. 3 depicts a logical model of an alternative configuration for a receiving host computing device configured to participate in multicast, multiple unicast, and/or unicast distribution of messages with time guaranteed and/or synchronized delivery, where the receiving host computing device hosts compute instances using a set of computing resources and also comprises isolated timing hardware that is outside the control of the compute instances. For example, delivery of a packet may be guaranteed to take place at a delivery destination at a guaranteed time, wherein the time of delivery is guaranteed to be highly accurate based on a synchronized time indicated at an isolated timing hardware clock at or near the destination location, wherein the isolated timing hardware releases the packet or information needed for viewing the packet at the specified "guaranteed" time. Furthermore, in some embodiments, delivery of multiple packets may be synchronized to take place at a same time at different destinations, for example at a synchronized guaranteed time of delivery. Also, in some embodiments, synchronized delivery may be performed at a synchronized time determined by a packet delivery mechanism, without a sender necessarily specifying the synchronized delivery time, but just specifying that a set of packets are to be delivered in a synchronized manner at a synchronized time. Additionally, a time synchronization agent synchronizes a hardware clock of the isolated timing hardware using a dedicated timing network. Also, the isolated timing hardware comprises a packet & time to deliver packet receiver configured to receive a packet from a data network and provide the packet to a packet encryptor which encrypts the packet, where the packet encryptor provides the encrypted packet to the storage manager/packet provider/key provider and provides the encryption key to an encryption key storage. The packet provider may provide the packet to a compute instance without delay, and an encryption key delivery determination component determines when to deliver the encryption key based on a specified delivery time for the packet and notifies the storage manager/key provider to deliver the encryption key from the encryption key storage at the specified time, according to some embodiments.

FIG. 3 depicts an example host computing device 315 in which embodiments of the present disclosure can be implemented. FIG. 3 depicts a logical model of a receiving host computing device 315, where the receiving host computing device 315 hosts compute instances 316 using a set of computing resources 310, according to some embodiments. The host computing device 315 also comprises isolated timing hardware 320 that is outside the control of the compute instances 316. A time synchronization agent 328 synchronizes a hardware clock 324 using a data network or a dedicated timing network 306.

A packet & time-to-deliver packet receiver 326 receives packets from senders through the data network 304, and provides the packet to a packet encryptor 334. The packet & time-to-deliver packet receiver 326 also obtains the time-to-deliver information associated with the packet and provides it to the encryption key delivery determination component 330. The packet encryptor 334 encrypts the packet. The packet encryptor 334 provides the encrypted packet to the storage manager/packet provider/key provider 332 and provides the encryption key to an encryption key storage 322. The encryption key storage 322 is managed by a storage manager 332. The packet provider 332 provides the packet, whose contents are inaccessible for the compute instances, to the destination compute instance 316. The packet provider 332 can provide the packet before the time-to-deliver time has occurred, since the destination compute instance cannot access the packet. The encryption key delivery determination component 330 then determines when to deliver the encryption key to the destination compute instance 316 based at least on the received time-to-deliver information and the hardware clock 324. The encryption key delivery determination component 330 notifies the storage manager/key provider 332 to deliver the packet from the encryption key storage 322 to the same destination compute instance 316 that received the packet at the appropriate time.

Figure 4:
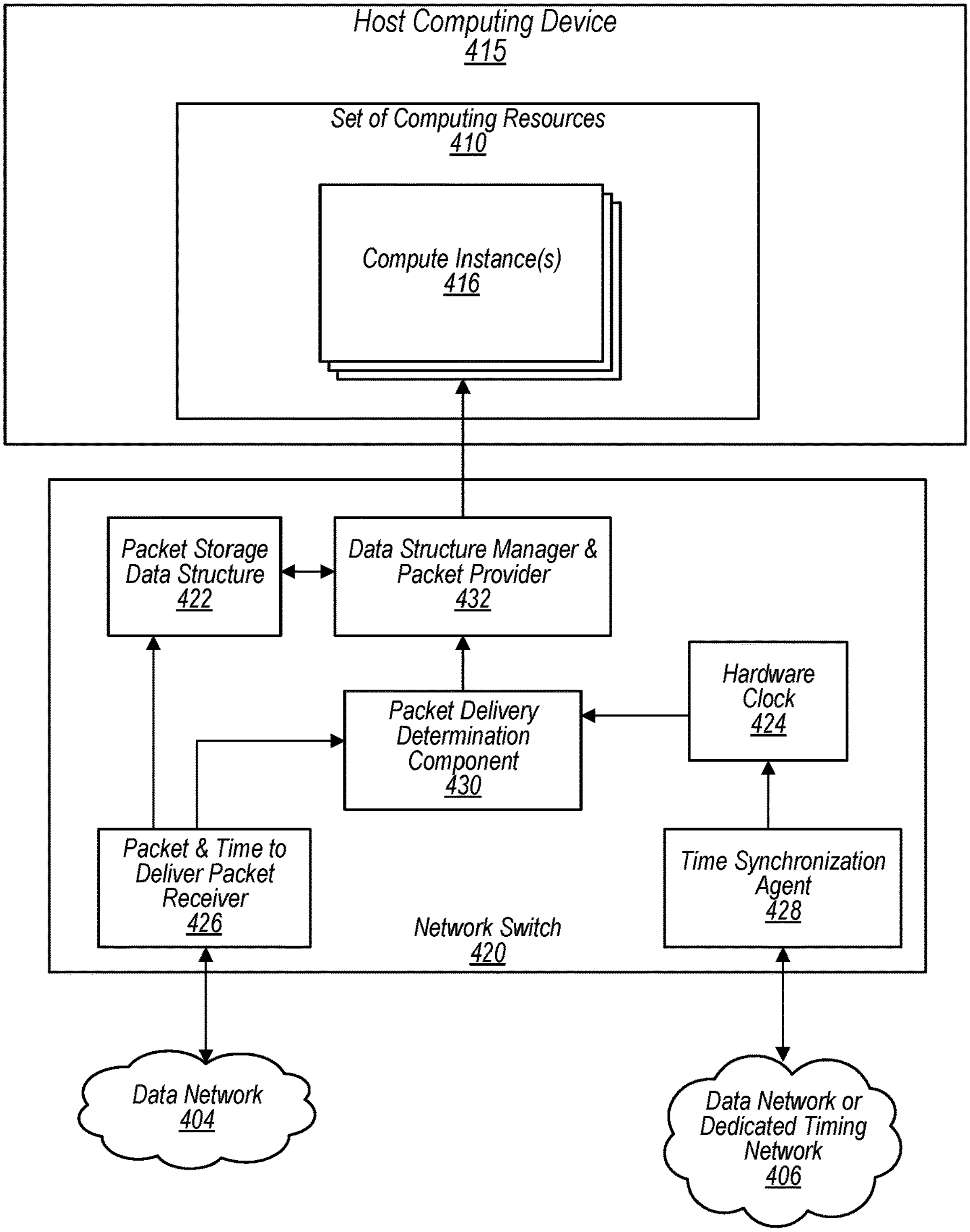
FIG. 4 depicts a logical model of yet another configuration for a receiving computing device configured to receive packets with guaranteed and/or synchronized delivery times. The computing device (which may be a single computer or a host that hosts multiple compute instances) is communicatively coupled to a network switch that comprises isolated timing hardware and that is outside the control of receiving computing device. A time synchronization agent of the isolated timing hardware of the network switch synchronizes a hardware clock of the isolated timing hardware using a dedicated timing network. The isolated timing hardware of the network switch also comprises a packet & time to deliver packet receiver configured to receive a packet from a data network with a specified delivery time and provide the packet to a packet storage data structure. The isolated timing hardware of the network switch also comprises a packet delivery determination component configured to determine when to deliver the packet based on the hardware clock and the specified delivery time for the packet and is configured to notify a data structure manager/packet provider to deliver the packet from the data structure at the specified time, according to some embodiments. In some embodiments, an encryption/encryption key delivery system similar to that shown for FIG. 2 may be implemented in isolated timing hardware of a network switch as shown in FIG. 4.

FIG. 4 depicts a logical model of a receiving host computing device 415 providing for multicast, multiple unicast, and/or unicast distribution of messages with guaranteed delivery times and/or delivery time synchronization. The receiving host computing device 415 hosts compute instances 416 using a set of computing resources 410. A network switch 420 communicatively coupled to the host computing device 415 comprises the isolated timing hardware that is outside the control of the compute instances 416. Like FIG. 2, a time synchronization agent 428 synchronizes a hardware clock 424 using a data network or a dedicated timing network 406. A packet & time to deliver packet receiver 426 receives a packet from a sender through a data network 404, and provides the packet to a packet storage data structure 422. The receiver 426 also receives the time-to-deliver information, either from the packet or from information separate from the packet, and provides the information to the packet delivery determination component 430. The packet delivery determination component 430 determines when to deliver the packet based at least on the hardware clock 424 and the received time-to-deliver information. The packet delivery determination component 430 notifies a data structure manager/packet provider 432 to deliver the packet from the data structure 422 to the destination compute instance 416 at the appropriate time, according to some embodiments.

Figure 5:
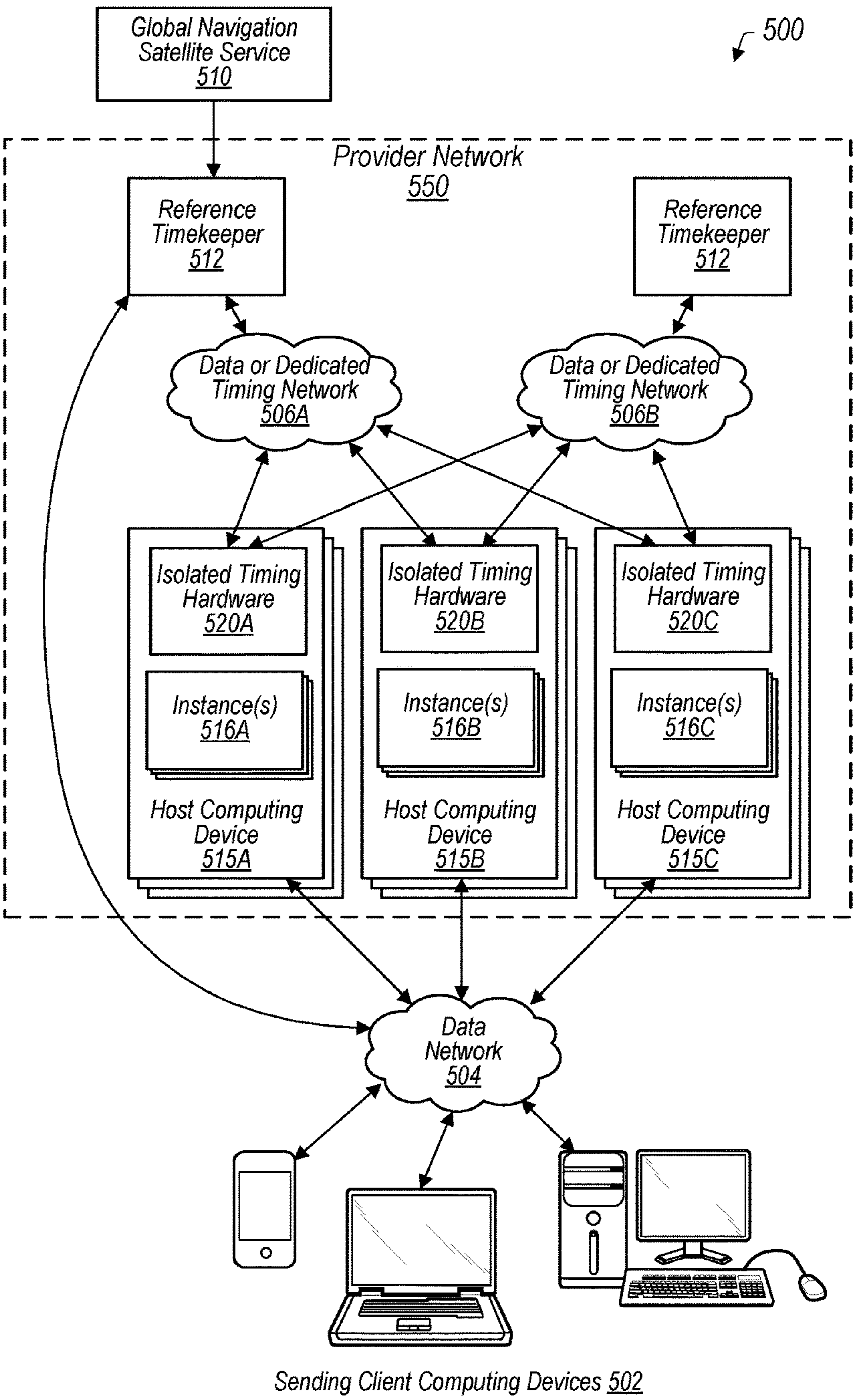
FIG. 5 depicts an example system environment including a provider network in which embodiments of the present disclosure can be implemented, where sending client computing devices multicast, multiple unicast, and/or unicast packets to multiple instances at multiple host computing devices, and where highly accurate time information is provided to the isolated timing hardware of the host computing devices from reference timekeepers using a data or dedicated timing network, according to some embodiments.

FIG. 5 depicts an example system environment including a provider network in which embodiments of the present disclosure can be implemented to provide highly accurate time information for multicast, multiple unicast, and/or unicast distribution of messages with guaranteed delivery times and/or delivery time synchronization, by the use of timing information received from a data or dedicated timing network (506A & 506B), according to some embodiments. The provider network 550 can be accessed by client computing devices 502 over a network 504. A provider network 550 (sometimes referred to simply as a "cloud"), refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in provider network data centers that provide those services.

The provider network 550 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the provider network, in contrast to resources requested by users of the provider network, which may be provisioned in user accounts.

In FIG. 5, the provider network 550 includes sets of host computing devices 515, labeled as set 515A, 515B, 515C in FIG. 5. Each set can represent a logical group of devices 515, such as a physical "rack" of devices. Each device can support one or more hosted machine instances 516A-C. Host machine instances 516 may be virtual machine instances, representing virtualized hardware (supported by underlying hardware of the devices 515) supporting, e.g., an operating system and applications. Hosted compute instances 516 may further represent "bare metal" instances, whereby a portion of the computing resources of the device 515 directly support (without virtualization) the instance 516. In some cases, an instance 516 may be created and maintained on behalf of a user. For example, a client may utilize a client computing device 502 to request creation of an instance 516 executing client-defined software. In other cases, instances 516 may implement functionality of the provider network 550 itself. For example, instances 516 may correspond to block storage servers, object storage servers, or compute servers that in term provide block storage, object storage, or compute, respectively, to client computing devices 502. Each host computing device 515 includes hardware computer memory and/or processors, an operating system that provides executable program instructions for the general administration and operation of that server, and a computer-readable medium storing instructions that, when executed by a processor of the server, allow the server to perform its intended functions. While not shown in FIG. 5, the provider network 550 may include other computing devices facilitating operation of the host computing devices 515, such as data stores to store account information, computing devices to implement logging, monitoring, and billing services, etc.

The provider network 550 can provide on-demand, scalable computing platforms to users through the network 504, for example allowing users to have at their disposal scalable "virtual computing devices" via their use instances 516 or services provided by such instances 516. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users.

The provider network 550 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs are the primary backbone locations linking users to the provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The provider network may deliver content from points of presence outside of, but networked with, these regions by way of edge locations, regional edge cache servers. This compartmentalization and geographic distribution of computing hardware enables the provider network to provide low-latency resource access to users on a global scale with a high degree of fault tolerance and stability. In some implementations, the provider network can include one or more cellular networks managed and provided by the cloud provider. The elements shown in FIG. 4 illustratively represent a collection of elements present in a single region or availability zone. These elements may thus be replicated in each such region or availability zone.

As illustrated in FIG. 5, instances 516 can communicate over network 504 with each other and with client computing devices 502. The network 504 can include any appropriate network, including an intranet, the Internet, a cellular network, a local area network or any other such network or combination thereof. In FIG. 5, the network 504 is illustratively a general-purpose communication network, such as the Internet. Accordingly, the network 504 may contain packetized information enabling arbitrary data exchange between networked devices. Protocols and components for communicating via the Internet or any of the other aforementioned types of communication networks are known to those skilled in the art of computer communications and thus, need not be described in more detail herein.

Client computing devices 502 can include any network-equipped computing device, for example desktop computers, laptops, smartphones, tablets, e-readers, gaming consoles, and the like. Clients can access the provider network 550 via the network 504 to view or manage their data and computing resources, as well as to use websites and/or applications hosted by the provider network 550. While shown as distinct in FIG. 1, elements of the provider network 550 may also act as clients to other elements of that network 550. Thus, a client device 502 can generally refer to any device accessing a network-accessible service as a client of that service.

Users can have a way to opt-in to the multicast, multiple unicast, and/or unicast services of the provider network, in some embodiments. For example, users can set a flag to expose or to not expose the multicast, multiple unicast, and/or unicast, and time-to-deliver information of packets that are received. Also, the users may opt into including or not including time-to-deliver information in packets sent from the user's compute instance(s). This opt-in can be an attribute of the compute instances 516 that are set by the users. In some embodiments, users can be charged for the multicast, multiple unicast, and/or unicast service, either for the whole service or per packet or message, depending on the embodiment.

In addition to the network, the host computing devices 515 can be connected to internal data or dedicated timing networks, denoted as networks 506A, 506B. These internal networks can carry data as well as time information. In some embodiments, one of the internal networks is a dedicated time network that only carries timing information. The internal data and/or dedicated time networks 506A-B can be further connected to one or more reference timekeepers 512, which act as a point of reference for time information delivered via the network. For example, each reference timekeeper 512 may be an atomic clock or a GNSS 510 receiver, and may thus act as a source of highly accurate time information for devices 515 within the network 406. In one embodiment, each different reference timekeeper 512 is synchronized to one another, and therefore shares to a high degree of accuracy a common time. For example, each timekeeper 512 may be synchronized to a common GNSS, such as GPS, with a high degree of accuracy (e.g., tens of nanoseconds).

The internal data and/or dedicated time network can include an interconnected set of devices configured to carry time information from the reference timekeeper 512 to the host computing devices 415 with minimal loss in accuracy (e.g., on the order of nanoseconds). For example, the networks 506 may include devices configured to the specifications of the White Rabbit Project, a known project to develop highly accurate timing networks. In some implementations, the data and/or dedicated time distribution network can be coupled between the GNSS receivers and every top of rack switch ("TOR") in a datacenter. To avoid issues of congestion or contention for network resources, each network 406 may be dedicated to time information, and provide such time information with little or no encoding. In other embodiments, the time information can traverse the normal data network of the provider network. In some embodiments the data network and a dedicated time network may utilize a common but electrically partitioned physical substrate. For example, cabling between the elements of FIG. 5 may include both wiring for the network and distinct wiring for the dedicated time network. The respective wirings can be electrically isolated from one another such that signals traversing the network do not inhibit signals traversing the dedicated time network. In other embodiments, the time signals traverse the same network as the data signals. The depicted timekeepers 512 and the internal networks 506 can be used to provide a time synchronization service provided by the isolated timing hardware 520. Such a service may be made available to isolated timing hardware 520A-520C.

Illustratively, each network (506A & 506B) may carry exclusively a fixed signal, such as a fixed-width pulse (e.g., a pulse-per-second, or PPS, signal or other signal of fixed width, including a fixed frequency signal) that is broadcast from a single reference timekeeper 512 to downstream devices. In one embodiment, the time information indicates time passage, without a point of reference for the present time. For example, the time information may indicate the passing of each second, but not which second is passing. In embodiments in which multiple timekeepers 512 exist within an internal network 506, devices on the network, such as timing switches, may operate to select a single upstream signal from a single timekeeper 512 to use as a source of time information to propagate to downstream devices, such as host devices 515. In some embodiments, the switches may select a signal based on metadata related to the signals, as discussed in more detail below. Moreover, switches or other devices within the internal network 406 may utilize other techniques to account for potential inaccuracies in the network 406. For example, the switches or other devices may account for latency on the network 406 due to physical distance between devices, such as by adjusting received time information based on expected latency (e.g., calculated based on known cable length, based on measured round trip communication time, etc.). Because the networks 506 may be dedicated to carrying time information from the reference timekeepers 512, the isolated timing hardware 520 of the host computing devices 515 may be configured to act purely as consumers of information on the networks 506, and be unable to transmit information on the networks 406.

In addition to connection to the data or dedicated time networks 506, reference timekeepers 512 may additionally connect to the general-purpose communication network 504. Illustratively, connection to the network 504 may facilitate collection of metadata regarding operation of the reference timekeepers 512, as discussed below. Moreover, in some embodiments the network is utilized to provide a reference time from reference timekeepers 512 to isolated timing hardware 520 of host computing devices 515, which reference time indicates the present time. For example, where the internal network 506 indicates the occurrence of a second marker, but not which second has occurred, isolated timing hardware 520 of host computing devices 515 may require a reference point to determine which second has occurred. This reference point need not share the same accuracy as time information provided by the internal network 506, as a reference time may be offset by plus or minus half the period of the time information. For example, if the reference time is early by four tenths of a second, an isolated timing hardware 520 of host computing device 515 may receive the reference time and adjust the reference time to the nearest second marker as indicated by the time information of the internal network 506, thus achieving time synchronization to the accuracy of the time information. In one embodiment, a reference time is transmitted over the network 504 according to a known timing protocol, such as NTP. While such protocols may not be sufficiently accurate to independently synchronize time, they may be sufficiently accurate to provide a reference time in accordance with embodiments of the present disclosure.

By utilizing a combination of a reference time (e.g., obtained via network 504) and time information obtained via an internal network 506, each instance of isolated timing hardware 520 of the host computing devices 515A through 515C may synchronize a local clock to that of a reference timekeeper 512. In accordance with embodiments of the present disclosure, that local clock time may then be used by packet delivery determination component 230 of FIG. 2 to determine when to deliver the packet based on the time-to-deliver information. In one embodiment, each host computing device 515 includes isolated timing hardware 520 that is isolated from computing resources of the instances 516, which hardware is utilized to maintain a clock of the host computing device 515. For example, the isolated timing hardware 520 may be included in an "offload" card physically installed on the device 515, which card includes separate computing resources (e.g., a distinct processor, distinct memory, etc.) from those resources used by the instances 516, where such separate computing resources can be dedicated to instance management tasks such as virtual machine management, input/output virtualization to network-attached storage volumes, local migration management tasks, instance health monitoring, and the disclosed host clock or virtualized hardware clock, along with attested time stamping. In one embodiment, the card is connected to the resources used by instances 516 via a Peripheral Component Interconnect Express (PCIe) bus of the host computing device 515. Thus, the instances 516, executing on their distinct computing resources, may communicate with the card (or other networking computing resources, such as isolated timing hardware 520) via local interfaces of the device 515, without traversing a network. Moreover, because such hardware 520 can be isolated from that of instances 516, issues such as resource contention, which may otherwise inhibit accurate timekeeping, can be avoided.

In accordance with embodiments of the present disclosure, isolated hardware of the host computing devices 515 may operate as a stratum 1 server, and/or operate as isolated timing hardware 520 (shown in FIG. 5 as isolated timing hardware 520A-C) for instances 516. In the parlance of certain network time protocols, "stratums" indicate distance from a reference clock. For example, "stratum 0" may indicate the reference clock, and "stratum 1" may indicate a device directly linked to the reference clock. Stratum 2 may indicate a device linked to a stratum 1 device over a network path. In FIG. 5, each host device 515 obtains time information over an internal network 506 (such as a data or dedicated time network) from a reference timekeeper 512 (e.g., a stratum 0 device). This enables the internal network 506A & 506B to act as a "direct link" to the reference timekeeper 512, such that time information need not flow over a general communication network (e.g., network 504). Accordingly, each host computing device 515 effectively operates as a stratum 1 server. Moreover, because instances 516 are co-located on a host computing device 515, instances 516 may not ever traverse the network 504 to obtain time information. Accordingly, each instance 516 is enabled to synchronize to a reference timekeeper with a very high accuracy.

Figure 6:
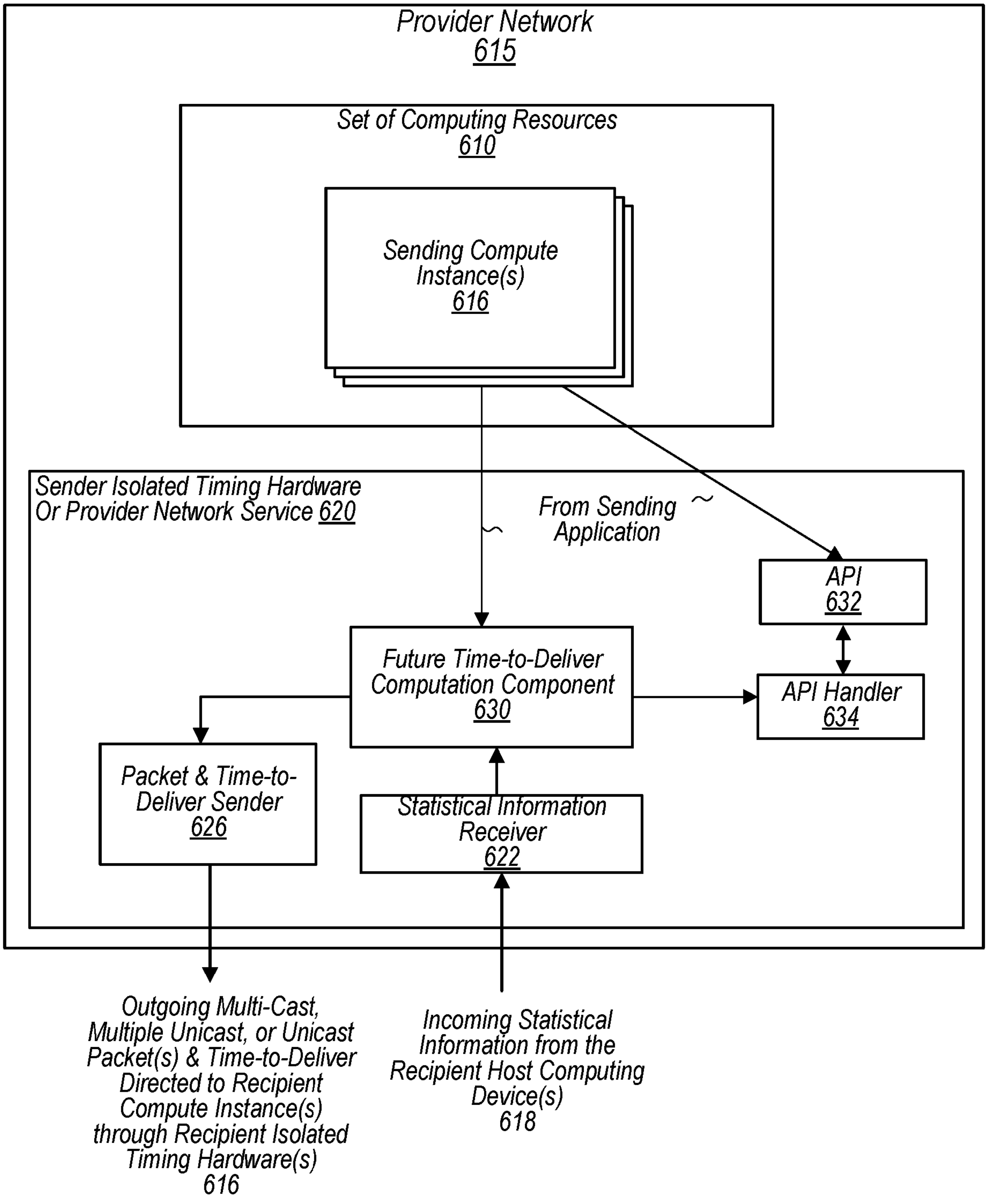
FIG. 6 depicts a logical model of compute instance(s) configured to provide multicast, multiple unicast, and/or unicast distribution of messages with guaranteed and/or synchronized delivery times, where a future time-to-deliver computation component is implemented as either a service of the provider network or as a component of isolated timing hardware that is communicatively coupled to the sending compute instance(s). A sending application of the sending compute instance(s) is configured to communicate with the service or isolated timing hardware through an API handled by an API handler, where a packet & time-to-deliver sender provides outgoing multi-cast, multiple unicast, and/or unicast packet(s) & time-to-deliver information directed to recipient compute instance(s) with a given multicast, multiple unicast, and/or unicast packet being sent. Also, the sending compute instance or its associated isolated timing hardware comprises a statistical information receiver configured to receive incoming statistical information from one or more recipient host computing devices and to use this statistical information to adjust future to time deliver computations for delivery of additional multicast, multiple unicast, and/or unicast packets, according to some embodiments.

Each of the host computing devices 515A-C can operate as a receiving host computing device of FIGS. 2-4, or a sending host computing device of FIG. 6. The host computing devices can send and receive packets from one another through an internal data network, which in some embodiments can be the same network (506A-B) used to communicate time information. For example, a compute instance 516C of host computing device 515C might send a multicast and/or multiple unicast packets to a destination compute instances 516A-B of host computing device 515A-B. In such a scenario, the isolated timing hardware 520C of sending host computing device 515C would receive the multicast and/or multiple unicast packets from the sending compute instance 516C, and would operate in accordance with the functionality described in FIG. 6. A time-to-deliver would be included in the packet by the sending compute instance 516C, in some embodiments. In other embodiments, the time-to-deliver would be determined by the isolated timing hardware 520C of sending host computing device 515C, and either added to the packet by the isolated timing hardware 520C, or sent as a different packet, where the time-to-deliver information can be placed in accordance to one of the different options described in FIGS. 9A-9D. The packet would be sent to the destination host computing devices 515A-B. The destination host computing devices 515A-B would operate in accordance with the functionality described in FIGS. 2, 3, and/or 4. The isolated timing hardware 520A-B of the destination host computing device 515A-B receives this multicast and/or multiple unicast packet such that it is outside the control the destination compute instances 516A-B. The isolated timing hardware 520A-B uses time-to-deliver associated with the packet to deliver the packet (or information to access the packet) to the destination compute instances 516A-B at the specific time-to-deliver time, in some embodiments. The multiple packets are provided by the isolated timing hardware 520A-B to the multiple users at the destination compute instances 516A-B within a time tolerance of the same time-to-deliver time, such that they are delivered near simultaneously, in some embodiments. The time tolerance can be determined by how tightly the clocks of the receiving isolated timing hardware 520A-B are synchronized with each other, in some embodiments.

FIG. 6 depicts an example sending host computing device 615 in which embodiments of the present disclosure can be implemented. FIG. 6 depicts a logical model of a host computing device 615 providing for multicast, multiple unicast, and/or unicast distribution of messages with guaranteed delivery times and/or delivery time synchronization at the sending host computing device. Of course, any host computing device can send and receive packets, but while FIGS. 2-4 focused on the receiving of multicast, multiple unicast, and/or unicast packets, obtaining associated time-to-deliver information, and delivering the packet (or information to access the packet) to the destination compute instances at the specific time-to-deliver time, FIG. 6 instead focuses on the sending of multicast, multiple unicast, and/or unicast packets with time-to-deliver information, and then obtaining feedback from the recipients. The provider network 615 comprises host computing device (not shown) that hosts compute instances 616 using a set of computing resources 610. The host computing device of some embodiments also comprises networking computing resources, such as isolated timing hardware 620, that is outside the control of the compute instances 616. In other embodiments, the sending application might communicate with a provider network service 620 that is outside the host computing device to perform the multicast, multiple unicast, and/or unicast distribution of messages with guaranteed delivery times and/or delivery time synchronization, where the sending application would provide the packet to be multicast, multiple unicast, and/or unicast (and possibly a time delta to calculate the future time-to-deliver), and the service 620 would perform the remaining operations including determining and communicating the time-to-deliver. The sending application of the sending compute instance(s) 616 can communicate with the service or isolated timing hardware 620 though an API 632 handled by an API handler 634.

In the sending isolated timing hardware/provider network service 620, a time synchronization agent (not shown) can synchronize a hardware clock using information from a data network or dedicated timing network. The hardware clock can be used to calculate the future time-to-deliver information for the packets. The sending computing resource, such as the sending isolated timing hardware or provider network service 620, can receive a multicast, multiple unicast, and/or unicast packet from a sending application of a sending compute instance 616. The packet can be received directly, or through an API 632 that is handled by an API handler 634. The future time-to-deliver computation component 630 can calculate the time-to-deliver for the received multicast, multiple unicast, and/or unicast packet. In some embodiments, the future time-to-deliver computation component 630 can calculate the time-to-deliver by using the longest network latency for the plurality of recipients, then add additional time to account for any network variability in delivery time, and then add this total waiting time to the current clock time to get a "future" time-to deliver. The future time-to-deliver computation component 630 can provide the multicast, multiple unicast, and/or unicast packet and the time-to-deliver information to the packet & time-to-deliver sender 626. In some embodiments this packet & time-to-deliver sender 626 might receive the packet directly after reception from the sending application, such that the packet itself bypasses the future time-to-deliver computation component 630. The packet & time-to-deliver sender 626 can either add the time-to-deliver information to the packet, or sent the time-to-deliver information as a different packet, where the time-to-deliver information can be placed in accordance to one of the different options described in FIGS. 9A-9D. The packet & time-to-deliver sender 626 provides the outgoing multicast, multiple unicast, and/or unicast packet and the time-to-deliver information 616 to recipient compute instances through the associated recipient isolated timing hardware.

With multicasting, multiple unicast, and/or unicast, there is no guarantee that a packet will reach all or any of the intended recipients. A packet might get dropped, might get corrupted, or a receiving device might have their queue full at the time. Therefore, in some embodiments, the statistical information receiver 622 of the sending computing resource 620 can also get feedback information, such as statistical information for the recipient host computing devices 618, regarding whether any of the previously sent multicast, multiple unicast, and/or unicast packets arrived late at any of the intended recipients. The feedback mechanisms can be implemented in the system or exposed to the client, depending on the embodiment. If, for example, a packet was sent at t=0, with a time-to-deliver at time t=10, and most of the recipients receive the packet by at least t=3, but one recipient gets it at t=11, then the feedback mechanism can tell the sending computing resource that one of the sent multicast, multiple unicast, and/or unicast packets recently arrived late. Delivery rates can be monitored quite closely, in some of these embodiments, and time-to-deliver values can be adjusted for future multicast, multiple unicast, and/or unicast packets based on the feedback information by the future time-to-deliver computation component 630.

Recipients can provide feedback 618 to the multicasts statistical information receiver 622 of the sending computing resource 620 either with every packet, or periodically, or after a number of packets have been processed. This feedback can include statistics information. The feedback can be regarding the timing of multicast, multiple unicast, and/or unicast packets that were actually delivered, including statistical information and whether any packets arrived after the time-to-deliver time. This feedback mechanism can allow a user, such as a financial market, to guarantee the market participants that a high percentage of market messages will be delivered simultaneously to all the market participants. The feedback mechanism can be an optional feature, in some embodiments, and can be enabled through and API 632, in some of these embodiments.

The sending computing resource 620 does not have to be part of the same provider network as the receiving computing devices. The packet can simply be sent in a format that the isolated timing hardware associated with the receiving host computing devices recognizes as a multicast, multiple unicast, and/or unicast packet that has time-to-deliver information associated with it. The packets might be sent to an agreed upon destination port at the receiving host computing device, for example, in order to be recognized as a multicast, multiple unicast, and/or unicast packet that has time-to-deliver information associated with it. The time-to-deliver information can be included with the packet, or sent separately from the packet, depending on the embodiment.

There are many ways to implement how the sending host computing device or sending instance 616 provided the time-to-deliver information for packets that are sent to the receiving host computing devices, depending on the embodiment. In some embodiments, the isolated timing hardware 620 adds the time-to-deliver to the packet (using the packet & time-to-deliver sender 626, for example). In some of these embodiments, the time-to-deliver or the delta to calculate the time-to-deliver was determined by the sending application, and some of these embodiments might involve modifying the operating system to allow passing time-to-deliver information from the compute instance. The time-to-deliver information can be passed using a control channel, in some embodiments. The time-to-deliver information can be metadata on top of the data of the packet itself. The time-to-deliver can be received from the compute instance by software, such as through the API 632, and then can be added to the packet by hardware 626, in some embodiments. In some embodiments, the time-to-deliver information can be provided in the packet as part of the NIC interface, or can provided as an additional data field in the descriptor, so that the driver and software stack does not need to be modified. If a tunnel is used to transport packets between host computing devices, in these embodiments, it is transparent to the user, and instead implemented by the isolated timing hardware and/or the control plane of the compute instances.

In other embodiments, the packets can be fully encapsulated as part of a tunnel. In some of these embodiments, the tunnel is understood and created by the user of the compute instance, in order to form an instance-to-instance tunnel. In some of these embodiments, when the packet is transported through the isolated timing hardware, the isolated timing hardware overwrites part of the encapsulated packet (which was encapsulated at the instance) with the time-to-deliver information. In some embodiments, the time-to-deliver information and the regular data of the packets are in two different paths in terms of how they can be retrieved. The receiving application running on the compute instance can retrieve the data of the packet, and as a separate operation (either through the operating system, such as an API, or through tunnel monitoring) can retrieve the time-to-deliver information of that packet. Therefore, one embodiment would require the modification of the operating system, and other embodiments don't need to modify the operating system. However, in all cases the time-to-deliver information needs to be retrieved in addition to the normal data flow.

To some extent, the time-to-deliver of the sent packet is inherently guaranteed to the sender because of the way the ecosystem was built. The receiving instance does not have the opportunity to set the time-to-deliver. However, there can be different ways for the sender to know that the receiver is receiving the packets at the time-to-deliver time, and that these packets were beyond the control of the receiving instance until that that. In some embodiments, when a relationship is set up between a sender and receiver, such as a VPC peering, an API can be used to indicate that packets sent across the relationship may have a feature selected such that the time-to-deliver information is signed, and the control plane and/or isolated timing hardware can implement the signing. In some of these or other embodiments, the control plane and/or isolated timing hardware verify the signature of the sender, so that the timestamps are delivered to the destination compute instances at the certified time-to-deliver time that the receiver can validate.

It should be noted that while, while it has been discussed that the isolated timing hardware 620 might comprises a hardware clock and a time synchronization agent in order to perform the functionality of the future time-to-deliver computation component 630, in some embodiments, a hardware component that performs time-to-deliver insertion, such as a virtualization offloading for compute instances 616, may perform similar packet sending and time-to-deliver insertion functions without requiring a time synchronization agent and a hardware clock. For example, in some embodiments, virtualization offloading hardware included in a chassis of host computing device (e.g., a hardware component similar to isolated timing hardware 620) may include a packet and time-to-deliver sender, a future time-to-deliver computation component 630, a statistical information receiver 622, and optionally include an API handler 634 and an API 632.

In some embodiments, a single piece of isolated timing hardware may include both components for determining time-to-deliver information and delivering that information with packets upon sending an outgoing packet (e.g., as shown in FIG. 6) and may also include components for obtaining time-to-deliver information (e.g., as shown in FIGS. 2-4) from received packets. For example, in some embodiments, a single piece of isolated timing hardware 120/220 may include a packet & time-to-deliver packet receiver 226, a packet storage data structure 222, a packet delivery determination component 230, a data structure manager/packet provider 230, a hardware clock 224, a time synchronization agent 226, a future time-to-deliver computation component 630, a packet & time-to-deliver sender 626, a statistical information receiver 622, an API handler 634, and API 632. In such embodiments, the isolated timing hardware 220/620 may include a single hardware clock 224 that is used to determine an accurate time to use in calculating time-to-deliver information for outgoing packets, and which may be used to determine when the time-to-deliver has occurred for incoming packets. Also, the single hardware clock 224 may be synchronized using a time synchronization agent (e.g., 228). Said another way, hardware clock 224 and time synchronization agent 228 may not necessarily be duplicated in an isolated timing hardware configured to both send and receive multicast, multiple unicast, and/or unicast packets comprising time-to-deliver information.

Figure 7:
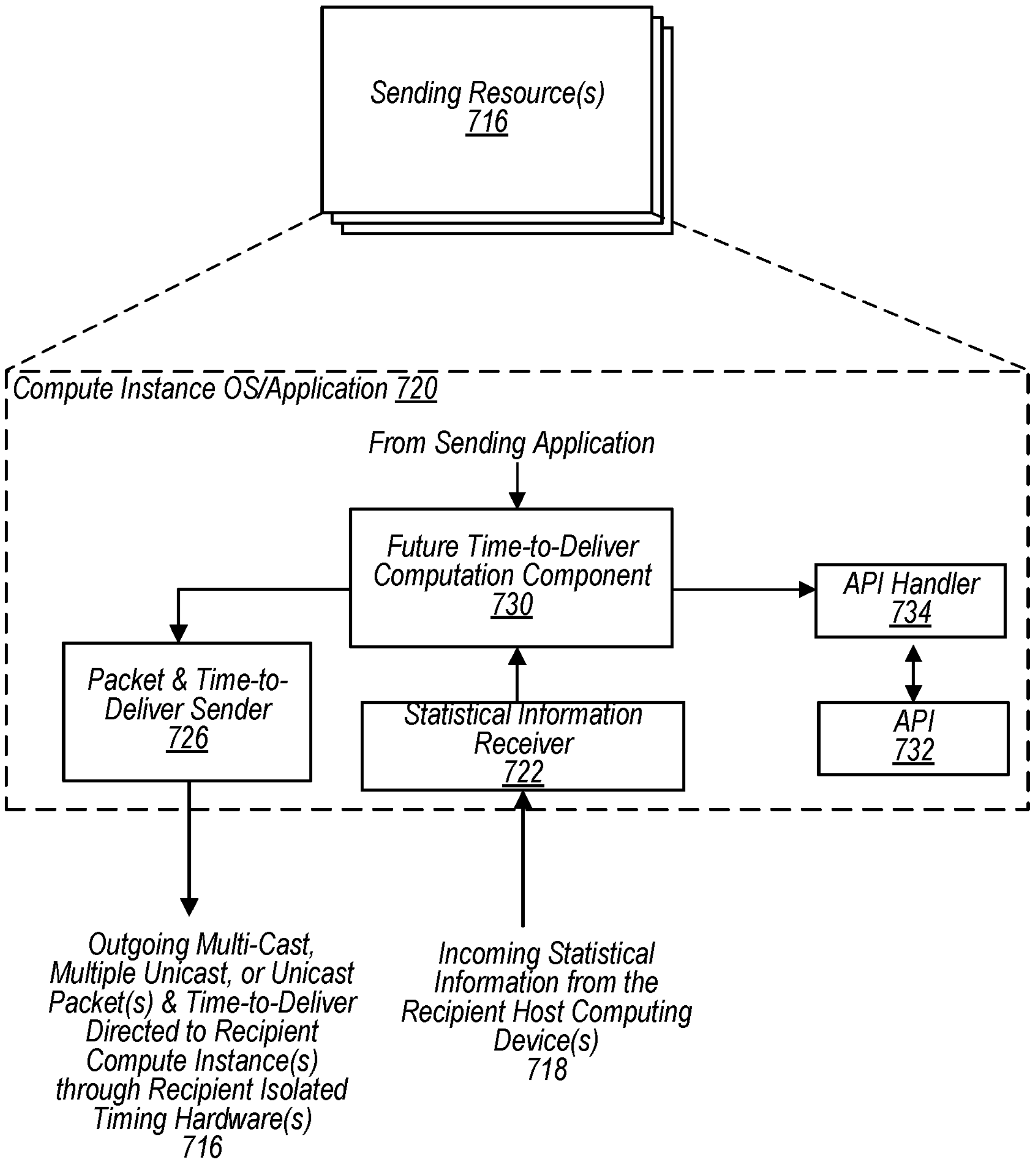
FIG. 7 depicts a logical model of a sending resource(s), wherein a future time-to-deliver computation component is implemented in software on a computing instance or is implemented in an OS application hosted on the sending resource, where a packet & time-to-deliver sender provides outgoing multi-cast, multiple unicast, and/or unicast packet(s) & time-to-deliver information with an outgoing packet directed to recipient compute instance(s) through recipient isolated timing hardware(s), and where a statistical information receiver receives incoming statistical information from one or more recipient host computing devices and uses this statistical information to adjust future to time deliver computations for delivery of additional multicast, multiple unicast, and/or unicast packets, according to some embodiments.

As mentioned above, in some embodiments, time-to-deliver calculation/sending may be performed in software as opposed to being performed by isolated timing hardware, such as isolated timing hardware 620. For example, FIG. 7 depicts a logical model of a sending host computing device, wherein a future time-to-deliver computation component 730 and a packet & time-to-deliver sender 726 is implemented in software on a computing instance 720 hosted on the sending resource 716, according to some embodiments.

In some embodiments, an incoming multicast, multiple unicast, and/or unicast packet from a sending application can be received by a future time-to-deliver computation component 730 and/or a packet & time-to-deliver sender 726, which may be implemented in an operating system 720 of compute instance 716 and/or which may be implemented as an application 720 executing at compute instance 716. The packet can be received from an OS call, or passing the packet through a software interface, or through an API 732 that is handled by an API handler 734. The future time-to-deliver computation component 730 can calculate the time-to-deliver for the received multicast, multiple unicast, and/or unicast packet. In some embodiments, the future time-to-deliver computation component 730 can calculate the time-to-deliver by using the longest network latency for the plurality of recipients, then add additional time to account for any network variability in delivery time, and then add this total waiting time to the current clock time to get a "future" time-to deliver. The future time-to-deliver computation component 730 can provide the multicast, multiple unicast, and/or unicast packet and the time-to-deliver information to the packet & time-to-deliver sender 726. In some embodiments this packet & time-to-deliver sender 726 might receive the packet directly after reception from the sending application, such that the packet itself bypasses the future time-to-deliver computation component 730. The packet & time-to-deliver sender 726 can either add the time-to-deliver information to the packet, or sent the time-to-deliver information as a different packet, where the time-to-deliver information can be placed in accordance to one of the different options described in FIGS. 9A-9D. The packet & time-to-deliver sender 726 provides the outgoing multicast, multiple unicast, and/or unicast packet and the time-to-deliver information 716 to recipient compute instances through the associated recipient isolated timing hardware.

With multicasting, multiple unicasting, and/or unicasting there is no guarantee that a packet will reach all the intended recipients. A packet might get dropped, might get corrupted, or a receiving device might have their queue full at the time. Therefore, in some embodiments, the statistical information receiver 722 of the software 720 can also get feedback information, such as statistical information for the recipient host computing devices 718, regarding whether any of the previously sent packets arrived late at any of the intended recipients. The feedback mechanisms can be implemented in the system or exposed to the client, depending on the embodiment. Delivery rates can be monitored quite closely, in some of these embodiments, and time-to-deliver values can be adjusted for future multicast, multiple unicast, and/or unicast packets based on the feedback information by the future time-to-deliver computation component 730.

Recipients can provide feedback 718 to the statistical information receiver 722 of the sending computing resource 720 either with every packet, or periodically, or after a number of packets have been processed. This feedback can include statistics information. The feedback can be regarding the timing of multicast, multiple unicast, and/or unicast packets that were actually delivered, including statistical information and whether any packets arrived after the time-to-deliver time. This feedback mechanism can allow a user, such as a financial market, to guarantee the market participants that a high percentage of market messages will be delivered simultaneously to all the market participants. The feedback mechanism can be an optional feature, in some embodiments, and can be enabled through and API 732, in some of these embodiments. In some embodiments, in which time-to-deliver computation and sending is implemented in software, the software may additionally include an API handler 734 that makes an API call to API 732 to calculate the time-to-deliver information in a similar manner as described above in regard to FIG. 6.

Figure 8A:
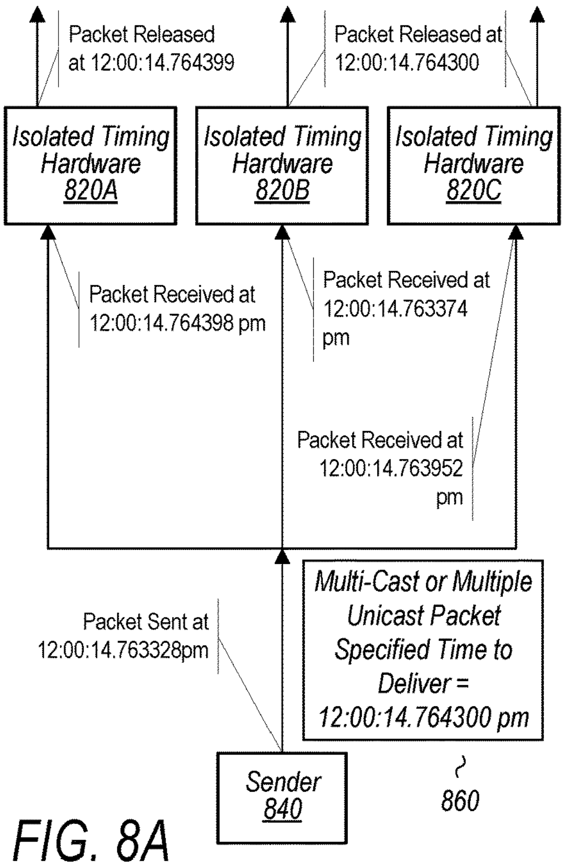
FIGS. 8A-8D depict a logical model of a progression of events of a sender sending a set of multicast and/or multiple unicast packets to a plurality of recipients, where the set of multicast and/or multiple unicast packets include a specified time to deliver the respective packets, where the respective packets arrive at a plurality of isolated timing hardware elements at different times, where each isolated timing hardware is associated with a recipient, the sender then receiving statistical information regarding the packet reception from the isolated timing hardware of the receivers, sending a second multicast and/or multiple unicast packet to the recipients that includes a different specified time to deliver the packet with a longer time delta (e.g. delivery time in the future), and receiving additional statistical information regarding the second packet reception from the isolated timing hardware of the receivers, according to some embodiments.
Figure 8C:
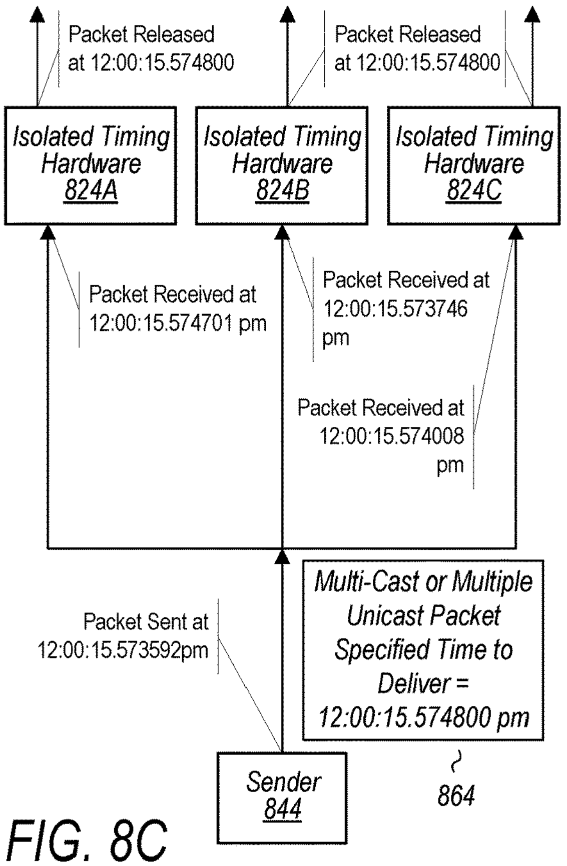
Figure 8B:
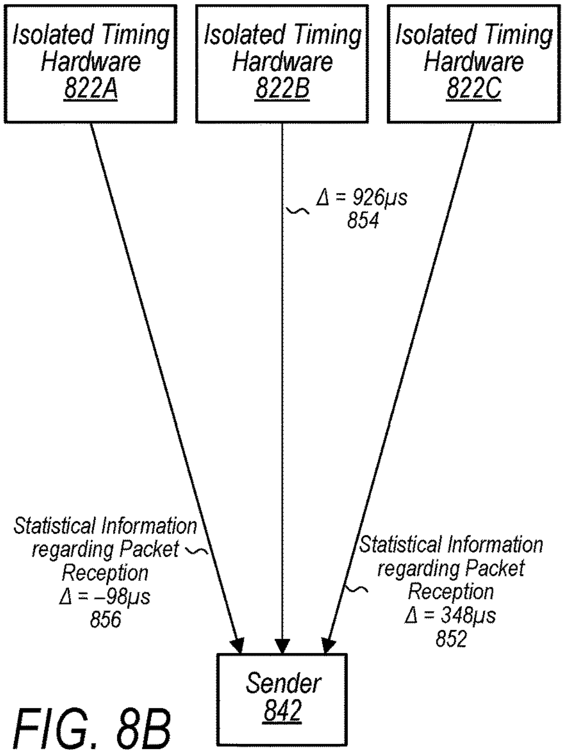
Figure 8D:
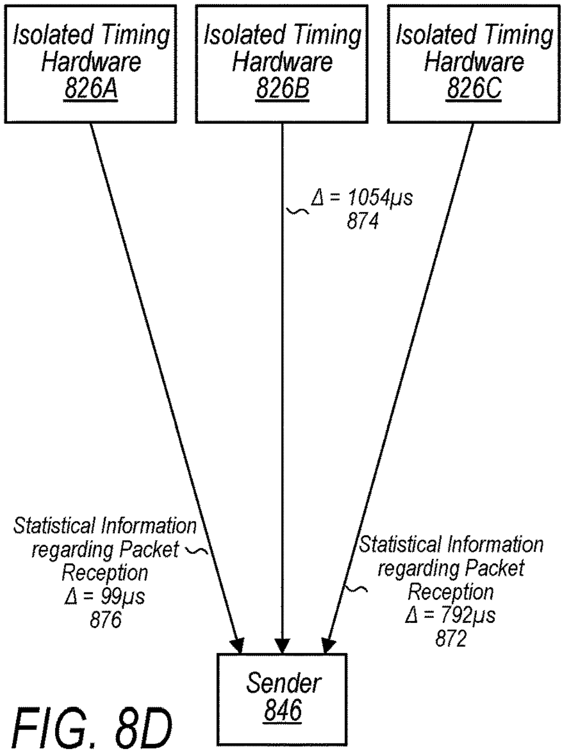

FIGS. 8A-8D depicts logical model of a progression of events of a sender (840, 842, 844, 846) sending a multicast and/or multiple unicast packet (860, 864) to a plurality of recipients that are associated with isolated timing hardware (820A-C, 822A-C, 824A-C, 826A-C), according to some embodiments. In FIG. 8A, the sender 840 sends the multicast and/or multiple unicast packet (860) that includes a specified time to deliver the packet. The packet arrives at a plurality of isolated timing hardware (820A-C) at different times, where each isolated timing hardware is associated with a recipient. In FIG. 8B, the sender (842) then receives statistical information (852, 854, 856) regarding the packet reception from the isolated timing hardware (822A-C) of the receivers. In FIG. 8C, the sender 844 sends a second multicast and/or multiple unicast packet (864) to the isolated timing hardware (824A-C) recipients that includes a different specified time to deliver the packet with a longer time delta. In FIG. 8D, the sender 846 then receives additional statistical information (872, 874, 876) regarding the second packet reception from the isolated timing hardware (826A-C) of the receivers.

More specifically, referring to FIG. 8A, the sender 840 sends the multicast and/or multiple unicast packet 860 to the isolated timing hardware (820A-C) with a specified time-to-deliver the packet as 12:00:14.764300 pm. Two of the isolated timing hardware (820B-C) receive the packet before the time-to-deliver time, and so release the packet to their respective recipients at the time-to-deliver time of 12:00:14.764300 pm. However, isolated timing hardware 820A receives the packet at 12:00:14.764398 pm, which is after the time-to-deliver time. Determining that the time-to-deliver has already occurred, isolated timing hardware 820A releases the packet to its recipient 1 μs later, at 12:00:14.764399 pm.

In FIG. 8B, the isolated timing hardware (822A-C) of the receivers send statistical information (852, 854, 856) regarding the packet reception back to the sender (842). Isolated timing hardware 822C sends a $\Delta$=348 μs (852) to the sender (842). This A is the amount of time that the packet was received before the time-to-deliver time of the packet 860.

For isolated timing hardware 822C, the packet was received at 12:00:14.763952 pm, which is 348 μs before the time-to-deliver time of 12:00:14.764300 pm. Similarly, isolated timing hardware 822B sends a Δ=926 μs (854) to the sender (842). For isolated timing hardware 822B, the packet was received at 12:00:14.763374 pm, which is 926 μs before the time-to-deliver time of 12:00:14.764300 pm. However, isolated timing hardware 822A sends a Δ=−98 μs (856) to the sender (842). For isolated timing hardware 822A, the packet was received late. The packet was received at 12:00:14.764398 pm, which is 98 μs after the time-to-deliver time of 12:00:14.764300 μm. Therefore, isolated timing hardware 822A sends a negative delta to the sender 842 as part of its statistical information regarding packet reception 856.

In FIG. 8C, the sender 844 sends a second multicast and/or multiple unicast packet (864) to the isolated timing hardware (824A-C) recipients that includes a different specified time to deliver the packet with a longer time delta. The sender 844 sends the multicast and/or multiple unicast packet 864 to the isolated timing hardware (824A-C) with a specified time-to-deliver the packet as 12:00:15.574800 pm. All three of the isolated timing hardware (820A-C) receive the packet before the time-to-deliver time, and so release the packet to their respective recipients at the time-to-deliver time of 12:00:15.574800 μm.

In FIG. 8D, the isolated timing hardware (826A-C) of the receivers send statistical information (872, 874, 876) regarding the packet reception back to the sender (846). Isolated timing hardware 826C sends a Δ=792 μs (872) to the sender (846). This A is the amount of time that the packet was received before the time-to-deliver time of the packet 864. For isolated timing hardware 826C, the packet was received at 12:00:15.574008 pm, which is 792 μs before the time-to-deliver time of 12:00:15.574800 pm. Similarly, isolated timing hardware 826B sends a Δ=1054 μs (874) to the sender (846). For isolated timing hardware 826B, the packet was received at 12:00:15.573746 pm, which is 1054 μs before the time-to-deliver time of 12:00:15.574800 pm. Similarly, isolated timing hardware 826A sends a Δ=99 μs (876) to the sender (846). For isolated timing hardware 826A, the packet was received at 12:00:15.574701 pm, which is 99 μs before the time-to-deliver time of 12:00:15.574800 μm.

Figure 9A:
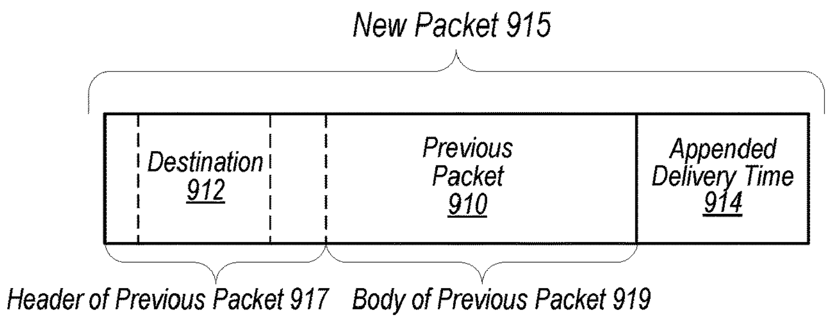
FIGS. 9A-9D illustrate different options for the sender isolated timing hardware or a provider network service to package a multicast, multiple unicast, and/or unicast packet received from a sending resource, along with a future delivery time, in order to provide the packet and the time-to-deliver information to a data network for transmission to the multicast, multiple unicast, and/or unicast packet recipients, according to some embodiments.

FIGS. 9A-9D illustrates different options for the sender isolated timing hardware or a provider network service to package a multicast, multiple unicast, and/or unicast packet received from a sending resource, along with a future delivery time that it determines, in order to provide the packet and the time-to-deliver information to a data network for transmission to the multicast, multiple unicast, and/or unicast packet recipients, according to some embodiments. For example, FIG. 9A illustrates a previous packet 910, that includes a header 917 and a body 919, where the header includes different kinds of information including a packet destination 912. FIG. 9A illustrates appending the time-to-deliver 914 to the packet to create a modified or new packet 915 larger in size than the original packet 910. While the figure shows appending the time-to-deliver 914 to the body of the previous packet 919, the time-to-deliver information 914 can also be appended to either the header 917 or the body 919 of the previous packet, and can be placed either before or after the header 917, or before or after the body 919 of the previous packet, in order to create the new packet 915. This new or modified packet 915 is then provided to a data network to transmit to the packet destination.

Figure 9B:
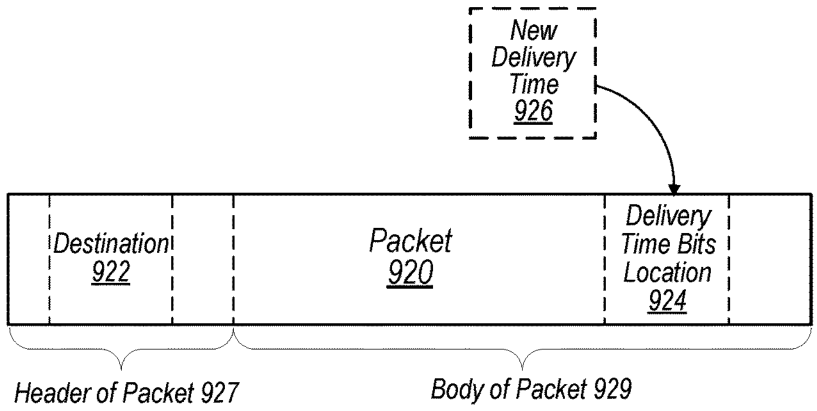

FIG. 9B illustrates overwriting bits of the packet with the time-to-deliver information. FIG. 9B illustrates a packet 920 that includes a header 927 and a body 929, where the header includes different kinds of information including a packet destination 922. The packet 920 can also include bits 924 for time-to-deliver information to be written to. FIG. 9B illustrates writing the new time-to-deliver information 926 to bits of the packet 924 to create a modified packet 920, wherein the modified packet is the same size as the original packet. While FIG. 9B shows the time-to-deliver information bits location 924 in the body of the packet 929, the bits of the packet for the timestamp 924 can be located in either the header 927 or the body 929 of the packet. For example, a timestamp can be embedded into the header of the packet 927, and it can then be overwritten by the isolated timing hardware of the host computing device on transmission. The new or modified packet 920 is transmitted to a data network to transmit to the packet destination.

Figure 9C:
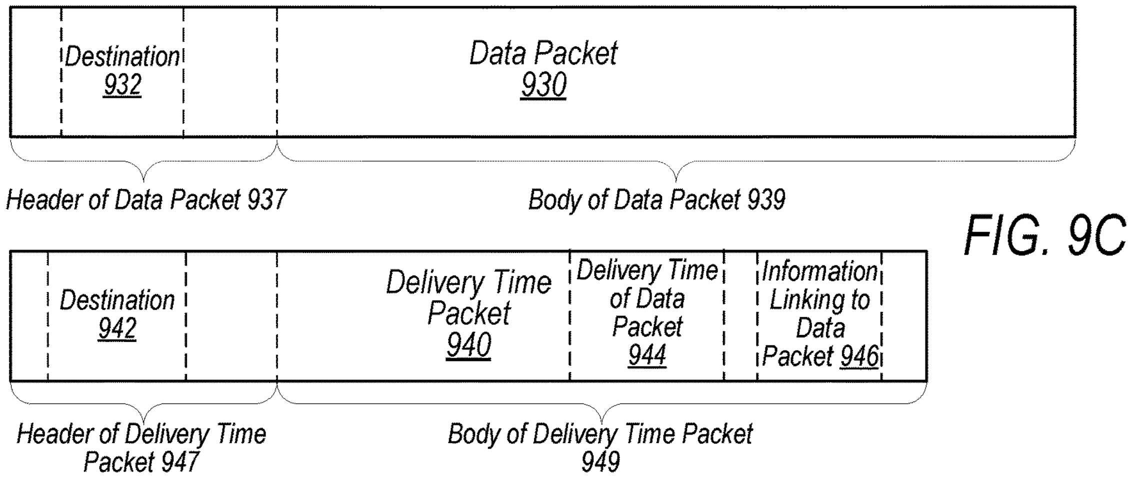

FIG. 9C illustrates creating a separate packet with the time-to-deliver information that is also sent to the packet destination. FIG. 9C illustrates a data packet 930 that includes a header 937 and a body 939, where the header includes different kinds of information including a packet destination 922. FIG. 9C illustrates creating a separate packet 940 comprising the time-to-deliver information 944, the same packet destination 947 as the data packet destination 932, and information linking 946 the created separate delivery time packet 940 to the data packet 930. The packet and the created separate packet are provided to a data network to transmit to the packet destination. Complexity is introduced at the receiver in these embodiments in order to associate the two packets together and to rebuild the association between the data packet 930, and the time-to-deliver information 944 that is matching the data packet 930 in the deliver time packet 940.

Figure 9D:
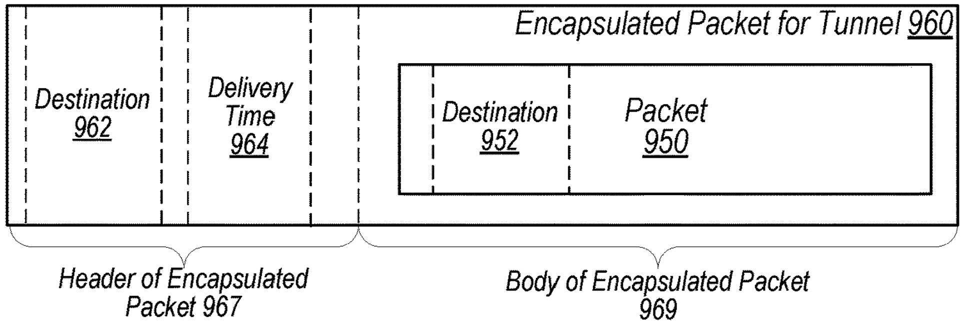

FIG. 9D illustrates encapsulating the packet 950 and the time-to-deliver information 964 according to a tunneling protocol, and providing the encapsulated packet 960 to the packet destination. FIG. 9D illustrates a data packet 950 that includes a header and a body, where the header includes different kinds of information including a packet destination 952. FIG. 9D illustrates encapsulating the packet 950 into an encapsulated packet 960 according to a tunneling protocol, wherein the encapsulated packet comprises the time-to-deliver information 964. In some embodiments, the encapsulated packet 960 can also include a destination 962 that is the same destination as the encapsulated packet 950. The encapsulated packet 960 comprising the packet 950 and the time-to-deliver information 964 is provided to a data network to transmit to the packet destination. The packet 950 can be encapsulated as part of a tunneling protocol, in some embodiments. In some of these embodiments, the encapsulated packet can be transmitted in a dedicated and/or new tunnel in accordance with the tunneling protocol. In some other of these embodiments, the tunneling protocol is an existing virtual network protocol that is already used between instances and/or host computing devices of a provider network, for example.

Figure 10:
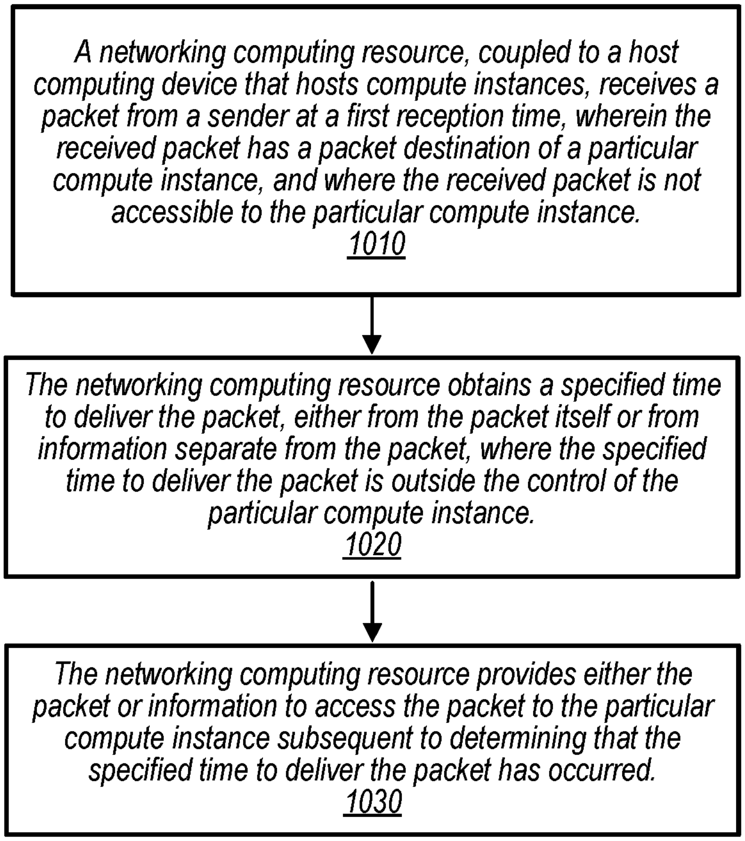
FIG. 10 is a flowchart of an illustrative method that can implement multicast, multiple unicast, and/or unicast distribution of messages with time guaranteed and/or synchronized delivery, where a networking computing resource receives a packet from a sender at a first reception time where the packet is not accessible to the particular compute instance, obtains, either from the packet or from information separate from the packet, a specified time to deliver the packet, wherein the specified time to deliver the packet is outside the control of the particular compute instance, and provides, subsequent to determining that the specified time to deliver the packet has occurred, either the packet or information to access the packet to the particular compute instance.

FIG. 10 is a flowchart of an illustrative method that can implement multicast, multiple unicast, and/or unicast distribution of messages with time guaranteed delivery times and/or delivery synchronization. In block 1010 a networking computing resource is coupled to a host computing device that hosts compute instances. The networking computing resource receives a packet from a sender at a first reception time where the received packet has a packet destination of a particular compute instance, and where the packet is not accessible to the particular compute instance. The flowchart transitions to block 1020 where the networking computing resource obtains a specified time to deliver the packet, either from the packet itself or from information separate from the packet, where the specified time to deliver the packet is outside the control of the particular compute instance. In final block 1030, the networking computing resource provides either the packet or information to access the packet to the particular compute instance subsequent to determining that the specified time to deliver the packet has occurred.

Figure 11:
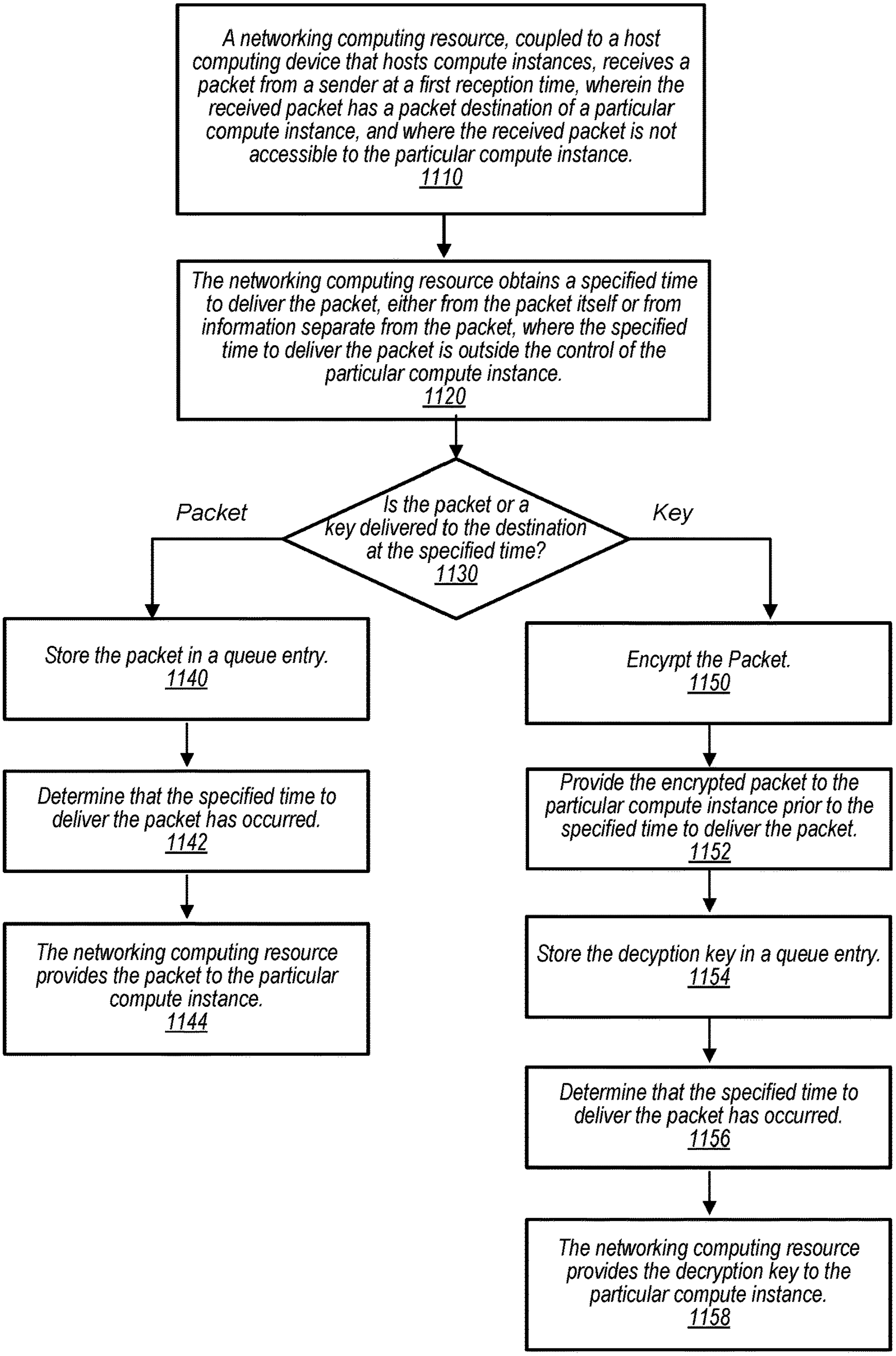
FIG. 11 is a flowchart of example methods according to some embodiments that can be used to implement multicast, multiple unicast, and/or unicast distribution of messages with guaranteed delivery times and/or delivery time synchronization, where a networking computing resource receives a packet from a sender at a first reception time where the packet is not accessible to the particular compute instance, obtains, either from the packet or from information separate from the packet, a specified time to deliver the packet, wherein the specified time to deliver the packet is outside the control of the particular compute instance, determines if the packet or an encryption key is delivered to the destination at the specified time, and depending on the answer performs actions commensurate with the appropriate sub-flowchart, according to some embodiments.

FIG. 11 is a flowchart of example methods according to some embodiments that can be used to implement multicast, multiple unicast, and/or unicast distribution of messages with guaranteed delivery times and/or delivery time synchronization. In starting block 1110 of FIG. 11, a networking computing resource, coupled to a host computing device that hosts compute instances, receives a packet from a sender at a first reception time, wherein the received packet has a packet destination of a particular compute instance, and where the received packet is not accessible to the particular compute instance. The flowchart then transitions to 1120 where the networking computing resource obtains a specified time to deliver the packet, either from the packet itself or from information separate from the packet, where the specified time to deliver the packet is outside the control of the particular compute instance.

The flowchart then determines, at 1130, whether the packet or a decryption key is going to be delivered to the destination compute instance at the specified time. If a packet is going to be delivered to the destination compute instance at the specified time, then the flowchart transitions to block 1140 which stores the packet in a queue entry, determines that the specified time to deliver the packet has occurred at block 1142, and then after such a determination, provides the packet to the particular compute instance at 1144. If a decryption key is going to be delivered to the destination compute instance at the specified time, then the flowchart transitions to block 1150 which encrypts the packet. The flowchart then transitions to block 152 provides the encrypted packet to the particular compute instance prior to the specified time to deliver the packet. Block 1154 stores the decryption key in a queue entry. The flowchart then transitions to 1156 which determines that the specified time-to-deliver the packet has occurred. After such a determination is made, the flowchart transitions to block 1158 where the networking computing resource provides the decryption key to the particular compute instance.

Figure 12:
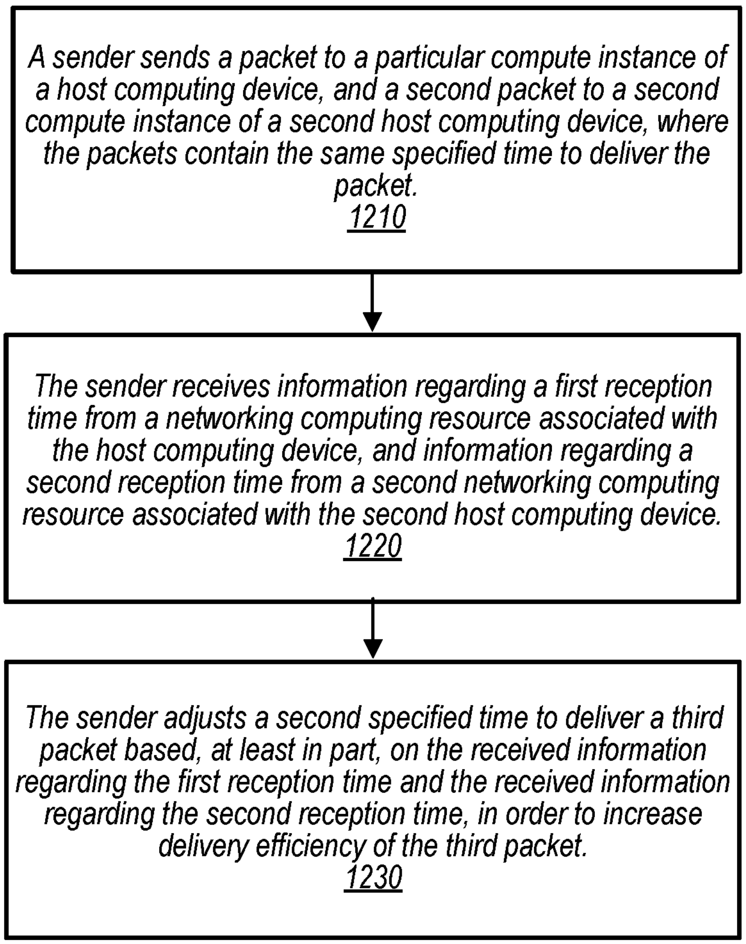
FIG. 12 is a flowchart of example methods of a sender of multicast, multiple unicast, and/or unicast packets according to some embodiments that can be used to implement multicast, multiple unicast, and/or unicast distribution of messages with guaranteed delivery times and/or delivery time synchronization, where the sender receives information from the receiving host computing devices and adjusts timing details for future sent packets, according to some embodiments.

FIG. 12 is a flowchart of example methods of a sender of multicast, multiple unicast, and/or unicast packets according to some embodiments that can be used to implement multicast, multiple unicast, and/or unicast distribution of messages with guaranteed delivery times and/or delivery time synchronization. The flowchart begins at block 1210 where a sender sends a packet to a particular compute instance of a host computing device, and also sends a second packet to a second compute instance of a second host computing device. Both packets contain the same specified time to deliver the packet. The flowchart then transitions to block 1220 where the sender receives information regarding a first reception time from a networking computing resource associated with the host computing device, along with information regarding a second reception time from a second networking computing resource associated with the second host computing device. The flowchart then transitions to block 1230 where the sender adjusts a second specified time to deliver a third packet based, at least in part, on the received information regarding the first reception time and the received information regarding the second reception time, in order to increase delivery efficiency of the third packet.

Figure 13:
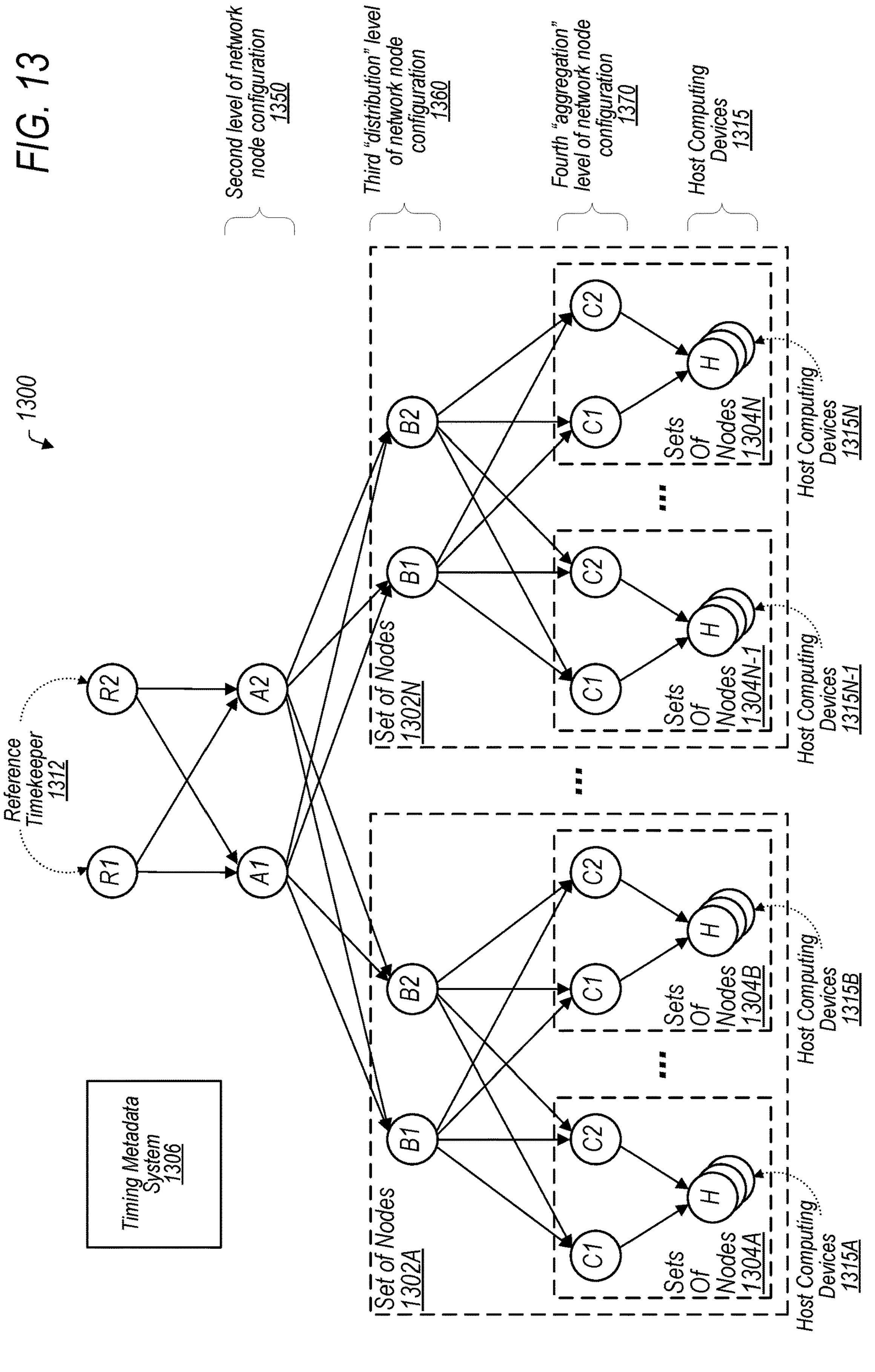
FIG. 13 depicts an example topology of a dedicated time network, such as shown as an option in FIG. 5, according to some embodiments.

With reference to FIG. 13, one example configuration 1300 of a dedicated time network (206 in FIG. 2, dedicated time network 306 in FIG. 3, dedicated time network 406 in FIG. 4, or dedicated time networks 506A-B in FIG. 5) will be described, which configuration may represent, for example a single dedicated time network (206 in FIG. 2, 306 in FIG. 3, 406 in FIG. 4, or 506A-B in FIG. 5, etc.) within a data center within the provider network 550. The configuration 1300 is shown in FIG. 13 as a directed acyclic graph (DAG), with information flowing from reference timekeepers (512 shown in FIG. 5) as nodes R1 and R2 in FIG. 13 (1312), through the network 506 (comprising the second, third, and fourth levels of network node configuration —1350, 1360, & 1370) and to host computing devices (515A-C in FIG. 5), shown in FIG. 13 as nodes H (1315A, 1315B, 1315N-1, & 1315N). The configuration 1300 thus includes network devices, such as switches, that connect nodes R1 and R2 to nodes H. Illustratively, the configuration includes at least two duplicated nodes at each level for redundancy and resiliency. For example, a second level of the configuration 1350 includes nodes A1 and A2, which in turn communicate with a third level of the configuration 1360 designated as nodes B1 and B2. At the third level (which may be referred to as a "distribution" level), nodes are logically grouped into sets 1302, each including a node B1 and B2. FIG. 13 shows two such sets 1302, set 1302A and 1302N. However, the configuration may include any number of sets 1300. Similarly, at the fourth level 1370 (which may be referred to as an "aggregation" level), nodes are logically grouped into level 4 sets 1304, denoted in FIG. 13 as level 4 sets 1304A-N. Each level 4 set 1304 includes two network nodes C1 and C2 that provide time information from the dedicated time network (506A-B in FIG. 5, etc.) to a logical grouping of host computing devices 1315, shown as nodes H. This logical grouping may represent, for example, a physical rack of such devices. Illustratively, a rack may include a "top of rack" switch that is configured to obtain time information from nodes C1 and C2, and to select time information from one of these nodes to pass onto host computing devices 1315 within the rack. Each level three set 1302 can include any number of level 4 sets 1304. Accordingly, the configuration 1300 enables the two reference timekeepers 1312 represented by nodes R1 and R2 to be shared among a large number of host computing devices 1315.

As noted above, each layer of the configuration 1300 may include redundant devices. While FIG. 13 shows two redundant devices, three or more devices are possible. This redundancy can ensure continued operation of the dedicated time network (506A-B in FIG. 5) even if cases of failure of a device. While total failure is possible, one problematic situation in the context of time information is a partial failure of a device, whereby the device fails to provide time information with a desired accuracy. For example, an issue with a device or with an interconnect between devices may cause a signal to be delayed. For general communication networks, such delays may be expected and tolerated. However, for time information, such delays can significantly impact synchronization. Accordingly, embodiments of the present disclosure may include within a configuration 1300 a timing metadata system 1306 configured to analyze metadata regarding operation of devices (e.g., nodes in the configuration 1300) to detect potential delays in operation, and in some cases to attribute such delays to particular nodes or edges within the configuration 1300.

More specifically, the timing metadata system 1306 may obtain metadata from each device in the configuration 1300

(e.g., each node, including switches in each of the switching levels of the network node configuration (1350, 1360, & 1370), as well as host computing devices 1315) regarding time information received over the network 406. In one embodiment, this metadata reflects jitter in a signal transmitted over the network 406, as measured relative to an internal clock (e.g., a crystal oscillator) of the measuring device. For example, each reference timekeeper 1312 may be configured to provide a PPS signal, with an edge aligned to each second. A receiving device (e.g., node A1 in the second-level 1350) may determine the duration between second-aligned edges to determine, e.g., that more or less than a second has elapsed according to its internal clock. Jitter represents the variation in this period, and in general more jitter indicates a higher inaccuracy with respect to time information. However, because jitter compares an internal clock to a network signal, it may not be possible to determine the source of such inaccuracy—that is, jitter may occur due to variance in a devices internal clock, variance in the network signal, or both.

By collecting metadata from multiple points within the network, the timing metadata system 1306 may at least partially disambiguate inaccuracies to determine their source. For example, in the configuration 1300, both nodes B1 and B2 in the third-level 1360 receive a signal from node A1. An increase in jitter (with respect to the signal from Al) at both nodes B1 and B2 can indicate an issue with operation of A1. An increase in jitter (with respect to the signal from A1) at B1 without a corresponding increase in jitter at B2 can indicate an issue with respect to node B1 or the connection between B1 and A1, rather than with respect to A1 itself. Similarly, B1 is connected to both A1 and A2. If the jitter at B2 increases with respect to the signal of A1 but not with respect to the signal of A2, this can indicate an issue with the connection between B1 and A1 (or, alternatively an issue with A1, which may be ruled out using the logic above). Alternatively, if the jitter at B2 increases with respect to signals of both A1 and A2, this can indicate an issue with B2 (or, alternatively an issue with both A1 and A2, which may be ruled out using the logic above). Accordingly, the timing metadata system 1306 may make pair-wise comparisons of timing metadata between various nodes at a given level of the configuration 1300 to identify particular nodes or edges that are experiencing low-accuracy operation.

While jitter is provided as one example of metadata regarding low-accuracy operation of nodes within the network 506, other types of metadata are possible. For example, in the instance that a node within in the network fails, downstream nodes may continue to retransmit time information further downstream to avoid cascading failure. Illustratively, if node A1 ceases to receive a signal from nodes R1 and R2, node A1 may nevertheless continue to transmit time information downstream to each node B1 and B2, such as by generating a PPS signal based on an internal clock of node A1. Because such signal may be less accurate than a signal locked to a reference timekeeper device, the timing metadata system 1306 may collect metadata indicating that a signal of a given node has been decoupled from an upstream node, and may notify downstream nodes that the node A1 is therefore operating with low accuracy. Additionally, or alternatively, the node A1 may modify the signal generated by that node to indicate low accuracy, such as by modifying the signal transmitted downstream in a manner that indicates low accuracy information.

On detecting a node or edge experiencing low-accuracy operation, the timing metadata system 1306 may notify relevant downstream nodes (e.g., those connected to the node or edge). These downstream nodes, in turn, may be configured to select an alternative upstream source of time information. Thus, if node A1 for example is experiencing low-accuracy operation, each node B1 and B2 may be configured to pass on time information from node A2, allowing the time information from node A1 to be dropped. While not shown in FIG. 13, the timing metadata system 1306 may be in network communication with each node. For example, each node and the system 1306 may communicate via the network 504 of FIG. 5. Illustratively, the timing metadata system 1306 may be implemented as software executing within an instance 516.

As discussed above, another source of inaccuracy in time information is clock drift, whereby a crystal oscillator or other time source within a device operates at a varying frequency, leading to an internal clock of that device running at a variable rate. One known contributor to clock drift is temperature. However, the specific drift experienced by an oscillator at a given temperature may vary according to the particular oscillator in question. Manufacturers may specify such drift statistically, guaranteeing for example a drift within a certain range at a given temperature. Unfortunately, these statistical measures are typically not accurate enough to conduct calibration with respect to an individual oscillator.

Embodiments of the present disclosure can address this problem by providing for device-specific drift measurements. In particular, the metadata collected by the timing metadata system 1306 may be utilized to calculate drift measurements relative to temperature on a per-device basis. As noted above, each device may periodically report to the timing metadata system 1306 metadata regarding time information obtained over the network. In one embodiment, this metadata includes a delta metric, indicating a difference in the measured versus expected width of the PPS signal (e.g., the signal occurred nanoseconds before or after expected according to an internal clock). Clock drift may be expected to at least partially account for such a delta. For example, a device may report that a PPS signal occurs around 5 nanoseconds early at a low temperature, and around 5 nanoseconds late at a high temperature. Under these conditions, a drift of 10 nanoseconds can be calculated to occur between the two temperatures. In practice, such clear drift may be difficult to detect with perfect precision. However, statistical analysis may be applied to metadata of a device over a long period of time in order to predict a device-specific drift. For example, the timing metadata system 1306 may correlate delta with device temperature (as also reported by each device), such as by calculating an average delta as a function of temperature, e.g., while excluding outliers that result from a device experiencing low-accuracy operation. In some embodiments, drift information (e.g., a drift curve) may be returned from the system 1306 to respective devices and used to calibrate an internal clock. For example, a device may apply an offset to time information provided by internal clock, with the offset determined based on device temperature and the drift information. In this way, the accuracy of individual devices (and thus the network 506) is increased.

In some embodiments, the timing metadata system 1306 may further be configured to estimate an accuracy of time information for a given host computing device 1315. For example, the timing metadata system 1306 may obtain metadata regarding operation of each node and edge between a reference timekeeper 1312 and a host computing device 1315, and analyze the metadata to determine a current accuracy of each node and edge. Potentially inaccuracy bands may be summed among the path from the reference timekeeper 1312 and the host computing device 1315 to determine an effective accuracy band at the host computing device. For example, where two nodes divide the reference timekeeper 1312 and the host computing device 1315, with a first node having an accuracy of plus or minus 2 microseconds relative to the reference timekeeper 1312 and a second node having an accuracy of plus or minus 3 microseconds relative to the first node, the expected accuracy of host computing device 1315 relative to the reference timekeeper 1312 may be 5 microseconds. In some embodiments, this information may be combined with an expected accuracy between isolated timing hardware 520 and an instance 516 in order to determine expected accuracy between the instance 516 and the reference timekeeper 1312. This expected accuracy may then be provided to the instance 516 as metadata regarding time information obtained from the isolated timing hardware 520. For example, when handling a request for a current time, the isolated timing hardware 520 may respond with the current time and metadata indicating the accuracy of that current time relative to the reference timekeeper 1312 (e.g., "it is Jan. 1, 2022, 00:00:00 UTC with an accuracy band of plus or minus 20 microseconds"). Accordingly, an instance 516 may obtain information indicating the expected accuracy of the time information.

Figure 14:
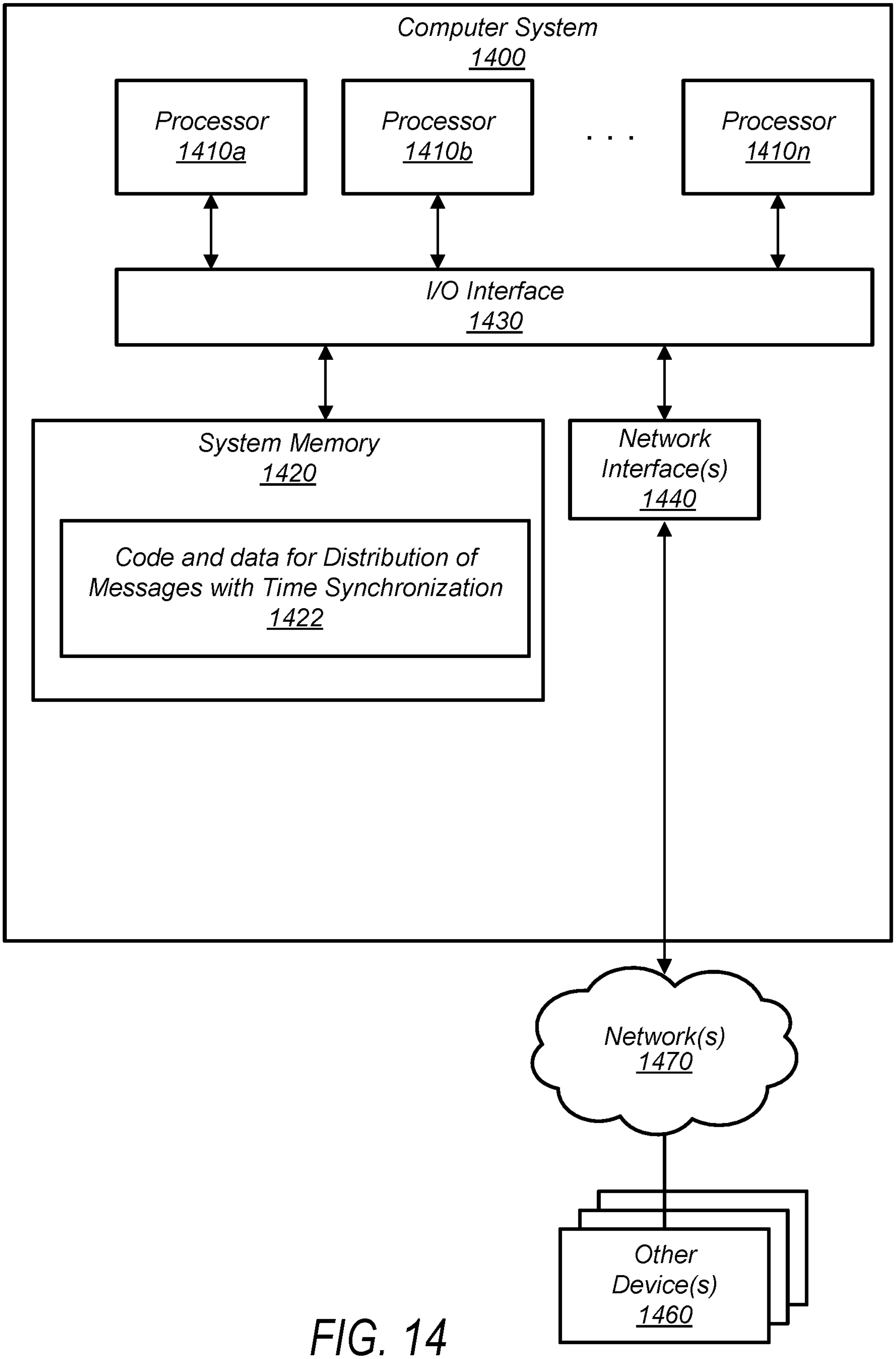
FIG. 14 is a block diagram illustrating an example computer system that may be used for trusted and/or attested packet time stamping service, according to some embodiments.

FIG. 14 is a block diagram illustrating an example computer system that may be used for providing highly accurate time information for time-stamping packets of hosted compute instances, according to some embodiments.

In at least some embodiments, a computer that implements a portion or all of the methods and apparatus for multicast, multiple unicast, and/or unicast distribution of messages with guaranteed delivery times and/or delivery time synchronizations as described herein may include a general-purpose computer system or computing device that includes or is configured to access one or more computer-accessible media, such as computer system 1400 illustrated in FIG. 14. FIG. 14 is a block diagram illustrating an example computer system that may be used in some embodiments. This computer system can be used for providing multicast, multiple unicast, and/or unicast distribution of messages with guaranteed delivery times and/or delivery time synchronization, or for example as a host computing device (215, 315, 415, or 515A-C) that executes one or more of the plurality of compute instances (216, 316, 416, or 516A-E). In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for multicast, multiple unicast, and/or unicast distribution of messages with guaranteed delivery times and/or delivery time synchronization, are shown stored within system memory 1420 as the code and data for a multicast, multiple unicast, and/or unicast distribution of messages with guaranteed delivery times and/or delivery time synchronization 1422.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1470, such as other computer systems or devices as illustrated in FIGS. 1, 2, 3, 4, 5, 6, 7, 8, and 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 2 through 7 for multicast, multiple unicast, and/or unicast distribution of messages with guaranteed delivery times and/or delivery time synchronization. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Any of various computer systems may be configured to implement processes associated with the provider network, the reference timekeepers, the nodes of the dedicated timing network, the host computing devices, the isolated timing hardware, or any other component of the above figures. In various embodiments, the provider network, the reference timekeepers, the nodes of the dedicated timing network, the host computing devices, the isolated timing hardware, or any other component of any of FIGS. 1-13 may each include one or more computer systems 1400 such as that illustrated in FIG. 14. In embodiments, provider network, the reference timekeepers, the nodes of the dedicated timing network, the host computing devices, the isolated timing hardware, or any other component may include one or more components of the computer system 1400 that function in a same or similar way as described for the computer system 1400.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer system, comprising one or more processors, wherein the one or more processors are configured to:

receive a packet from a sender at a first reception time, wherein:

the received packet comprises a packet destination of a particular compute instance of one or more compute instances hosted in the computer system, the computer system comprises a system clock that is synchronized to a hardware-based reference clock connected to the system clock, the packet is received at the computer system via a data network;

the hardware-based reference clock obtains a signal from a reference timekeeper via a dedicated time network that is separate from the data network, and the received packet is not accessible to the particular compute instance;

obtain, either from the packet or from information separate from the packet, a specified time to deliver the packet;

determine using the system clock of the computer system that the specified time to deliver the packet has occurred; and provide upon determination that the specific time to deliver the packet has occurred, either the packet or information to access the packet to the particular compute instance.

2. The computer system of claim 1, wherein:

the packet is received from the sender at the first reception time using a networking computing resource of the computer system;

the networking computing resource is software implemented on the computer system; and either the packet or information to access the packet provided to the particular compute instance is provided using the networking computing resource upon determination that the specific time has occurred.

3. The computer system of claim 1, wherein:

the packet is received from the sender at the first reception time using a networking computing resource of the computer system, the networking computing resource is an isolated timing hardware of the computer system; and either the packet or information to access the packet provided to the particular compute instance is provided using the networking computing resource of the computer system upon determination that the specific time has occurred.

4. The computer system of claim 3, wherein the isolated timing hardware of the computer system is a top-of-rack switch of the computer system, and wherein the isolated timing hardware comprises one or more processors and memory independent from one or more processors that implement the one or more compute instances.

5. The computer system of claim 1, wherein the system clock is a hardware clock, and wherein the computer system is further configured to:

set the system clock of the computer system based on the signal corresponding to the hardware-based reference clock, wherein the signal is obtained from the reference timekeeper via the dedicated time network inaccessible to the one or more compute instances.

6. The computer system of claim 5, wherein the reference timekeeper provides the signal corresponding to the hardware-based reference clock synchronized to a Global Navigation Satellite System (GNSS).

7. A method, comprising:

receiving, by a computer system, a packet from a sender at a first reception time, wherein:

the received packet comprises a packet destination of a particular compute instance of one or more compute instances hosted in the computer system;

the computer system comprises a system clock that is synchronized to a hardware-based reference clock connected to the system clock;

the packet is received at the computer system via a data network;

the hardware-based reference clock obtains a signal from a reference timekeeper via a dedicated time network that is separate from the data network; and the received packet is not accessible to the particular compute instance;

obtaining, by the computer system, either from the packet or from information separate from the packet, a specified time to deliver the packet;

determining using the system clock of the computer system that the specified time to deliver the packet has occurred; and providing by the computer system, upon determination that the specific time to deliver the packet has occurred, either the packet or information to access the packet to the particular compute instance.

8. The method as recited in claim 7, further comprising: setting, by the computer system, the system clock of the computer system based on the signal corresponding to the hardware-based reference clock, wherein the signal is obtained from the reference timekeeper via the dedicated time network inaccessible to the one or more compute instances, wherein the system clock is a hardware clock.

9. The method as recited in claim 7, wherein either: the sender is a compute instance hosted by a second computer system of a same compute service that comprises the computer system; or the sender is outside the compute service that comprises the computer system.

10. The method as recited in claim 7, wherein either a network interface card in the computer system implements the system clock, or a network switch of the computer system implements the system clock.

11. The method as recited in claim 7, further comprising: providing, by the system clock of the computer system, information regarding the first reception time to the sender.

12. The method as recited in claim 7, further comprising: receiving, at a second computer system, a second packet from the sender at a second reception time different than the first reception time, wherein a second one or more compute instances are hosted in the second computer system, wherein the second packet comprises a second packet destination of a second compute instance of the second one or more compute instances, wherein the second computer system comprises a second system clock that is synchronized to the hardware-based reference clock connected to the second system clock, and wherein the second packet is not accessible to the second compute instance;

obtaining, by the second computer system, either from the second packet or from information separate from the second packet, the specified time to deliver the second packet;

determining using the second system clock of the second computer system that the specified time to deliver the second packet has occurred;

providing by the second computer system, upon determination that the specified time to deliver the second packet has occurred, either the second packet or information to access the second packet to the second compute instance; and wherein the received packet is provided by the computer system to the particular compute instance, and the second packet is provided by the second computer system to the second compute instance, within a time tolerance of the specified time to deliver the packet.

13. The method as recited in claim 12, further comprising: sending, by the sender, the packet to the particular compute instance of the computer system, and the second packet to the second compute instance of the second computer system, wherein the packet and the second packet comprise the specified time to deliver the packet;

receiving, by the sender, information regarding the first reception time from the computer system, and information regarding the second reception time from the second computer system; and adjusting, by the sender, a second specified time to deliver a third packet based on the received information regarding the first reception time and the received information regarding the second reception time, in order to increase delivery efficiency of the third packet.

14. The method as recited in claim 7, further comprising: encrypting the packet;

providing, by the computer system, the encrypted packet to the particular compute instance prior to the specified time to deliver the packet; and wherein the providing either the packet or information to access the packet to the particular compute instance further comprises:

providing to the particular compute instance, by the computer system, and subsequent to the determining that the specified time to deliver the packet has occurred, a key to decrypt the packet.

15. The method as recited in claim 7, further comprising: storing, by the computer system, either the received packet or the information to access the received packet, along with the specified time to deliver the received packet, in a queue entry, wherein a queue comprising the queue entry comprises one or more additional queue entries; and wherein said providing either the packet or the information to access the packet to the particular compute instance further comprises:

providing, subsequent to determining that the specified time to deliver the packet has occurred, either the received packet or the information to access the received packet stored in the queue to the particular compute instance.

16. One or more non-transitory, computer-readable, storage media storing program instructions, that when executed on or across one or more processors, cause the one or more processors to:

receive a packet from a sender at a first reception time, wherein:

the received packet comprises a packet destination of a particular compute instance of one or more compute instances hosted in the computer system;

the computer system comprises a system clock that is synchronized to a hardware-based reference clock connected to the system clock;

the packet is received at the computer system via a data network;

the hardware-based reference clock obtains a signal from a reference timekeeper via a dedicated time network that is separate from the data network; and the received packet is not accessible to the particular compute instance;

obtain, either from the packet or from information separate from the packet, a specified time to deliver the packet;

determine using the system clock of the computer system that the specified time to deliver the packet has occurred; and provide upon determination that the specific time to deliver the packet has occurred, either the packet or information to access the packet to the particular compute instance.

17. The one or more non-transitory computer-readable storage media of claim 16, wherein the program instructions further cause the one or more processors to:

set the system clock of the computer system based on the signal corresponding to the hardware-based reference clock, wherein the signal is obtained from the reference timekeeper via the dedicated time network inaccessible to the one or more compute instances, wherein the system clock is a hardware clock.

18. The one or more non-transitory computer-readable storage media of claim 16, wherein:

the sender is a compute instance hosted by a second computer system of a same compute service that comprises the computer system; or the sender is outside the compute service that comprises the computer system.

19. The one or more non-transitory computer-readable storage media of claim 16, wherein either a network interface card in the computer system implements the system clock, or a network switch of the computer system implements the system clock.

20. The one or more non-transitory computer-readable storage media of claim 16, wherein the program instructions further cause the one or more processors to:

certify, before providing either the packet or the information to access the packet to the particular compute instance, that the specified time to deliver the packet was created by the sender.

* * * * *